US011638132B2

(12) United States Patent
Perras et al.

(10) Patent No.: US 11,638,132 B2
(45) Date of Patent: Apr. 25, 2023

(54) PROCEDURES ENABLING PRIVACY FOR WTRUS USING PC5 COMMUNICATION

(71) Applicant: IDAC Holdings, Inc., Wilmington, DE (US)

(72) Inventors: Michelle Perras, Montreal (CA); Khalid Anwar, Montreal (CA); Saad Ahmad, Montreal (CA); Alec Brusilovsky, Downingtown, PA (US); Samir Ferdi, Kirkland (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 12 days.

(21) Appl. No.: 17/056,925

(22) PCT Filed: Jun. 10, 2019

(86) PCT No.: PCT/US2019/036341
§ 371 (c)(1),
(2) Date: Nov. 19, 2020

(87) PCT Pub. No.: WO2019/245783
PCT Pub. Date: Dec. 26, 2019

(65) Prior Publication Data
US 2021/0211870 A1    Jul. 8, 2021

Related U.S. Application Data

(60) Provisional application No. 62/812,676, filed on Mar. 1, 2019, provisional application No. 62/741,962, filed
(Continued)

(51) Int. Cl.
H04W 4/40 (2018.01)
H04W 76/11 (2018.01)
(Continued)

(52) U.S. Cl.
CPC ............... *H04W 4/40* (2018.02); *H04L 67/12* (2013.01); *H04W 12/02* (2013.01); *H04W 12/037* (2021.01); *H04W 76/11* (2018.02)

(58) Field of Classification Search
CPC ......... H04L 67/12; H04L 67/14; H04L 69/00; H04L 69/324; H04W 12/02;
(Continued)

(56) References Cited

U.S. PATENT DOCUMENTS

2007/0297367 A1    12/2007 Terry et al.
2011/0238997 A1 *  9/2011 Bellur .................. H04L 9/3242
                                                    713/168
(Continued)

FOREIGN PATENT DOCUMENTS

RU        2400942 C1      9/2010
WO    WO-2016122533 A1 *  8/2016 ........... H04L 67/146
(Continued)

OTHER PUBLICATIONS

3GPP TS 23.303 V15.0.0, (Jun. 2017), Proximity-based Services (ProSe), Release 15.
(Continued)

*Primary Examiner* — Dung Hong
(74) *Attorney, Agent, or Firm* — Jerome G. Schaefer

(57) ABSTRACT

A method for changing layer 2 (L2) identifiers (ID)s during an ongoing vehicle-to-everything session between a source wireless transmit/receive unit (WTRU) and a peer WTRU includes communicating between the source and a peer WTRUs based on existing L2 IDs and an existing session ID. On a condition that a trigger event occurs, the source WTRU and the peer WTRU each generate new L2 IDs as well as respective portions of a new session ID. The new L2
(Continued)

IDs are subsequently used along with the new session ID to increase privacy of communication between the source WTRU and the peer WTRU.

17 Claims, 18 Drawing Sheets

Related U.S. Application Data on Oct. 5, 2018, provisional application No. 62/688,614, filed on Jun. 22, 2018.

(51) Int. Cl.
*H04W 12/037* (2021.01)
*H04L 67/12* (2022.01)
*H04W 12/02* (2009.01)

(58) Field of Classification Search
CPC ..... H04W 12/037; H04W 12/61; H04W 4/40; H04W 4/70; H04W 4/80; H04W 76/11; H04W 76/14; H04W 4/46; H04W 80/02; H04W 4/44
See application file for complete search history.

(56) References Cited

U.S. PATENT DOCUMENTS

| | | |
|---|---|---|
| 2014/0119544 A1 | 5/2014 | Lee et al. |
| 2017/0202038 A1 | 7/2017 | Ahmad |
| 2017/0289098 A1 | 10/2017 | Chun et al. |
| 2018/0159935 A1 | 6/2018 | Cavalcanti et al. |
| 2019/0053251 A1 | 2/2019 | Loehr et al. |
| 2019/0089547 A1* | 3/2019 | Simplicio, Jr. ....... H04L 63/108 |
| 2019/0223008 A1* | 7/2019 | Vanderveen ......... H01Q 21/205 |
| 2020/0100088 A1 | 3/2020 | Kim et al. |
| 2020/0145798 A1 | 5/2020 | Kim et al. |
| 2020/0178048 A1 | 6/2020 | Kim et al. |
| 2020/0336258 A1* | 10/2020 | Zhu ..................... H04L 43/0835 |

FOREIGN PATENT DOCUMENTS

| | | |
|---|---|---|
| WO | WO 2017027355 A1 | 2/2017 |
| WO | 2017173072 A1 | 10/2017 |
| WO | WO 2018066876 A1 | 4/2018 |
| WO | WO 2018128505 A1 | 7/2018 |
| WO | WO 2018208061 A1 | 11/2018 |

OTHER PUBLICATIONS www.3gpp.org/ftp/tsg ct/WGI nmcc-sm ex-CNI/TSGCI 10lbis Spokane/docs/[retrieved on Jan. 20, 2017]—the whole document, V2X privacy over PC5 3GPP Draft; CI-170340, 3rd Generation Partnership Project (3GPP), Mobile Competence Centre, 650, Route Des Lucioles, F-06921 Sophia-Antipolis Cedex, Francevol. CT WGI, No. Spokane (WS), USA;Jan. 16, 2017-Jan. 20, 2017.
3GPP TS 24.334 V15.1.0—Dec. 2017 Proximity-Services (ProSe) User Equipment (UE) to ProSe function protocol aspects; Stage 3—Release 15.
www.3gpp.org/ftp/Meetings 3GPPSYNC/CT/Docs/—[retrieved on Mar. 6, 2016] Section 10.4.5.2; Qualcomm Incorporated: "Security establishment procedures for Prose one-to-one communication", 3GPP Draft; 24334 CR0260R2 (REL-13) CI-161418-WAS-161255-WAS-160937-Security,—3rd Generationpartnership Project (3GPP), Mobile Competence Centre; 650. Route Des Lucioles ; F-06921 Sophia-Antipolis, vol. CT WGI. No. Jeju (Korea); Feb. 15, 2016-Feb. 19, 2016, Mar. 6, 2016 (Mar. 6, 2016), XP051075002.
3GPP TS 23 285 V1500 (Mar. 2018) Architecture Enhancements for V2X Services—Release 15.
3GPP TS 23.502 V15.1.0 (Mar. 2018); Procedures for the 5G System; Stage 2 (Release 15).
3GPP TR 23.786 V0.6.0—(Jun. 2018), Study on Architecture Enhancements for EPS and 5G System to Support Advanced V2X Services—Release 16.
www.3gpp.org/ftp/tsg sa/WG3 Security/TSGS3 87 Ljubljana/Docs/—[retrieved on May 9, 2017] the whole document May 9, 2017 (May 9, 2017), XP051269098, : "Clarification of ID change for V2X PC5 conmunication" 3GPP Draft; S3-171109 Clarification of ID Change for V2X PC5, 3rd Generation Partnership Project (3GPP), Mobile Competence Centre; 650, Route Des Lucioles ; F-06921 Sophia-Antipolis Cedex ; France, vol. SA WG3. No. Ljubljana, Slovenia;May 15, 2017-May 19, 2017.

* cited by examiner

US 11,638,132 B2

PROCEDURES ENABLING PRIVACY FOR WTRUS USING PC5 COMMUNICATION

CROSS REFERENCE TO RELATED APPLICATIONS

This application is a U.S. National Stage Application under 35 U.S.C. § 371 of International Patent Application No. PCT/US2019/036341, filed 10 Jun. 2019, which is incorporated herein by reference in its entirety.

This application claims the benefit of U.S. provisional patent application No. 62/688,614, filed 22 Jun. 2018, U.S. provisional patent application No. 62/741,962, filed 5 Oct. 2018, and U.S. provisional application No. 62/812,676, filed 1 Mar. 2019, all of which are incorporated herein by reference in their entirety.

BACKGROUND

Vehicle to everything (V2X) communications can include communications between a vehicle and any other suitable entity, such as vehicle-to-vehicle (V2V), vehicle-to-infrastructure (V2I), vehicle to pedestrian (V2P), vehicle to network (V2N) and so forth. V2X can also refer to the standards pertaining to such communications. PC5 is an interface for communicating between V2X devices as a type of sidelink or proximity service (ProSe) direct communication.

SUMMARY

This summary is provided to introduce a selection of concepts in a simplified form as a prelude to the more detailed description that is presented later. The summary is not intended to identify key or essential features, nor is it intended to delineate the scope of the claimed subject matter. Embodiments expressed in the various figures are related and the features therein may be combined unless otherwise stated.

In an embodiment, a method for use in an ongoing vehicle-to-everything (V2X) session includes updating at least a source wireless transmit/receive unit (WTRU) with privacy parameters. The method includes communicating between a source wireless transmit/receive unit (WTRU) and a peer WTRU based on an existing layer 2 (L2) identifier (ID). Given that a trigger event occurs, the source WTRU generates a new source L2 ID for the source WTRU, communicates the new source L2 ID to the peer WTRU, receives from the peer WTRU a message that responds to the new source L2 ID, and communicates between the source WTRU and the peer WTRU based on the new source L2 ID.

In an embodiment, the peer WTRU L2 ID is also changed. The peer WTRU changes its L2 ID and the source WTRU receives the new peer L2 ID from the peer WTRU. This reception of the new peer L2 ID by the source WTRU may occur after the source WTRU communicates the new source L2 ID to the peer WTRU. Thereafter, the source WTRU and the peer WTRU may communicate with each other based on the new source L2 ID and the new peer L2 ID.

In an embodiment, the source and peer L2 IDs may be updated as well as a session ID for communication between the source WTRU and the peer WTRU. The session ID is updated using contributions of a most significant byte (MSB) and a least significant byte (LSB). The source WTRU generates a new MSB of a session ID used to communicate with the peer WTRU and also generates the new source L2 ID. The source WTRU communicates the new MSB of the session ID in conjunction with communicating the new source L2 ID to the peer WTRU. The source WTRU receives a new least significant byte (LSB) of the session ID from the peer WTRU along with receiving a new peer L2 ID. Thereafter, the source WTRU and the peer WTRU communicate based on the new source L2 ID and the new peer L2 ID and also with a new session ID that includes the new MSB and the new LSB of the session ID.

In an embodiment, a feature of communicating the new source L2 ID to the peer WTRU includes communicating using one of a keepalive procedure, a privacy procedure, or another communication procedure used between a source WTRU and a peer WTRU. The source WTRU may communicate the new source L2 ID across layers on the source WTRU before communicating with the peer WTRU based on the new source L2 ID.

In an embodiment, a trigger event to cause a change of at least a source L2 ID may include any of a timer that expires, an upper layer or an application layer of a V2X application that requests a new L2 ID, a determination that the source WTRU moved into a new geographic area, the source WTRU receiving new provisioning parameters from a V2X control function or a V2X application server, or the source WTRU receiving a request from the peer WTRU to change an L2 ID. The session ID may be a security context session ID. Communication between the source WTRU and the peer WTRU may include communicating on a PC5 reference link.

In an embodiment, a source wireless transmit/receive unit (WTRU) may include circuitry, including a transmitter, a receiver, a processor, and memory. The circuitry of the WTRU is configured communicate, using the transmitter and receiver, between the source WTRU and a peer WTRU based on a layer 2 (L2) identifier (ID). On a condition that a trigger event occurs, the source WTRU generates a new source L2 ID for the source WTRU, communicates the new source L2 ID to the peer WTRU, and communicates with the peer WTRU based on the new source L2 ID.

In an embodiment where the peer WTRU as well as the source WTRU have a change in L2 ID, the source WTRU may receive a new peer L2 ID after communicating the new source L2 ID to the peer WTRU. The source WTRU may then communicate with the peer WTRU based on the new source L2 ID and the new peer L2 ID.

In an embodiment, a computer-readable storage medium may include instructions which when executed by a computer cause the computer to carry out any of the described methods described herein.

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

Figure 1A:
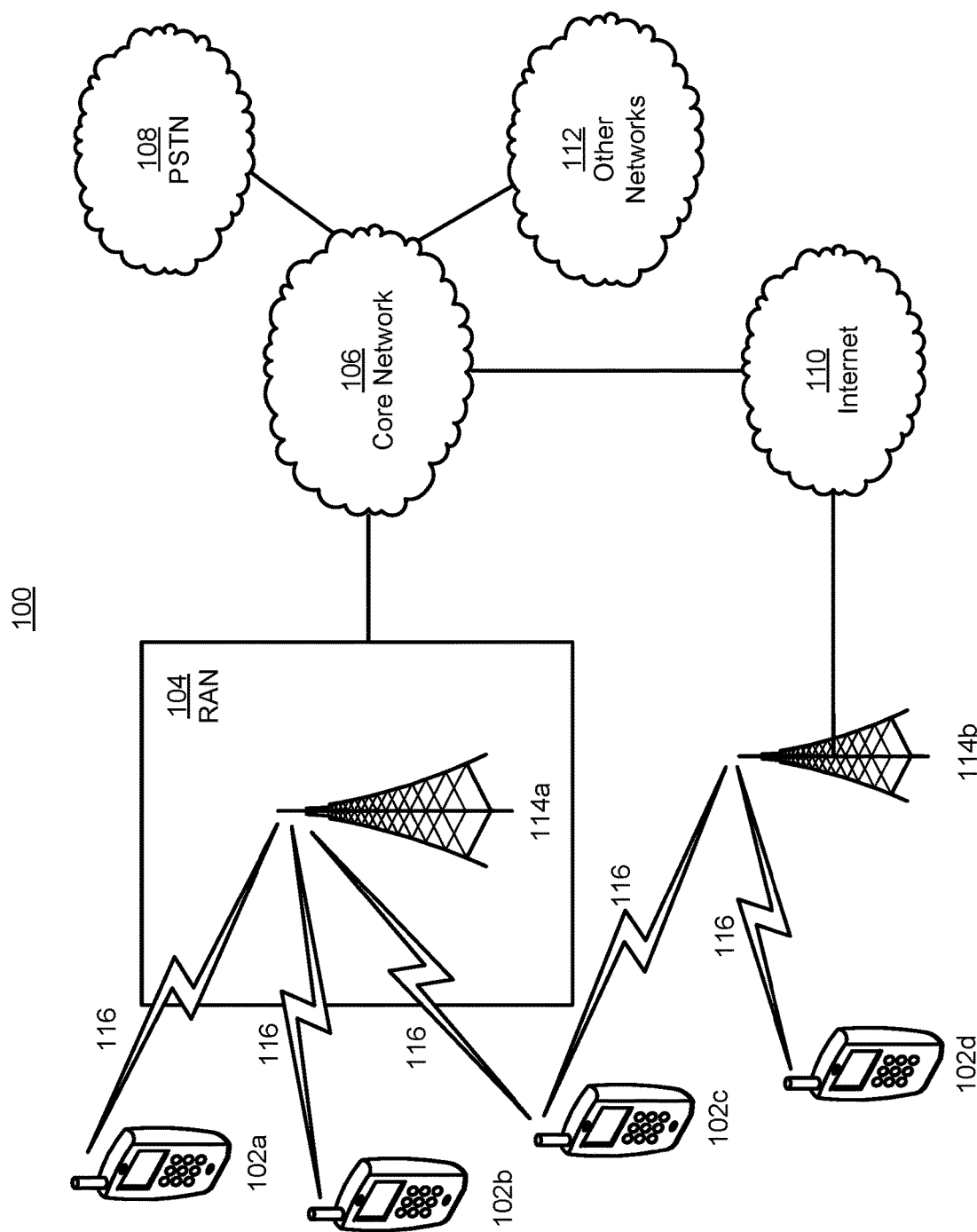
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
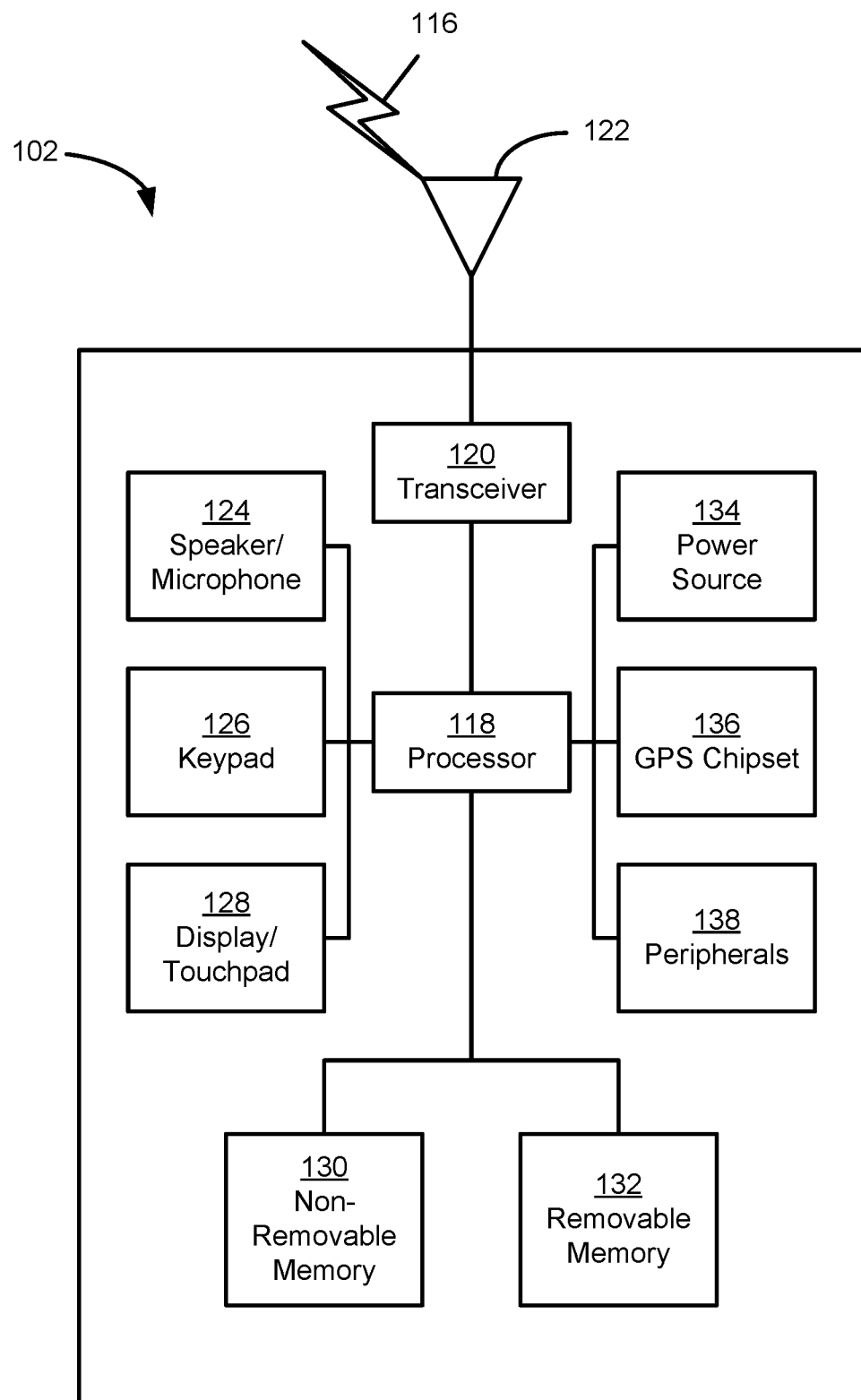
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134 and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
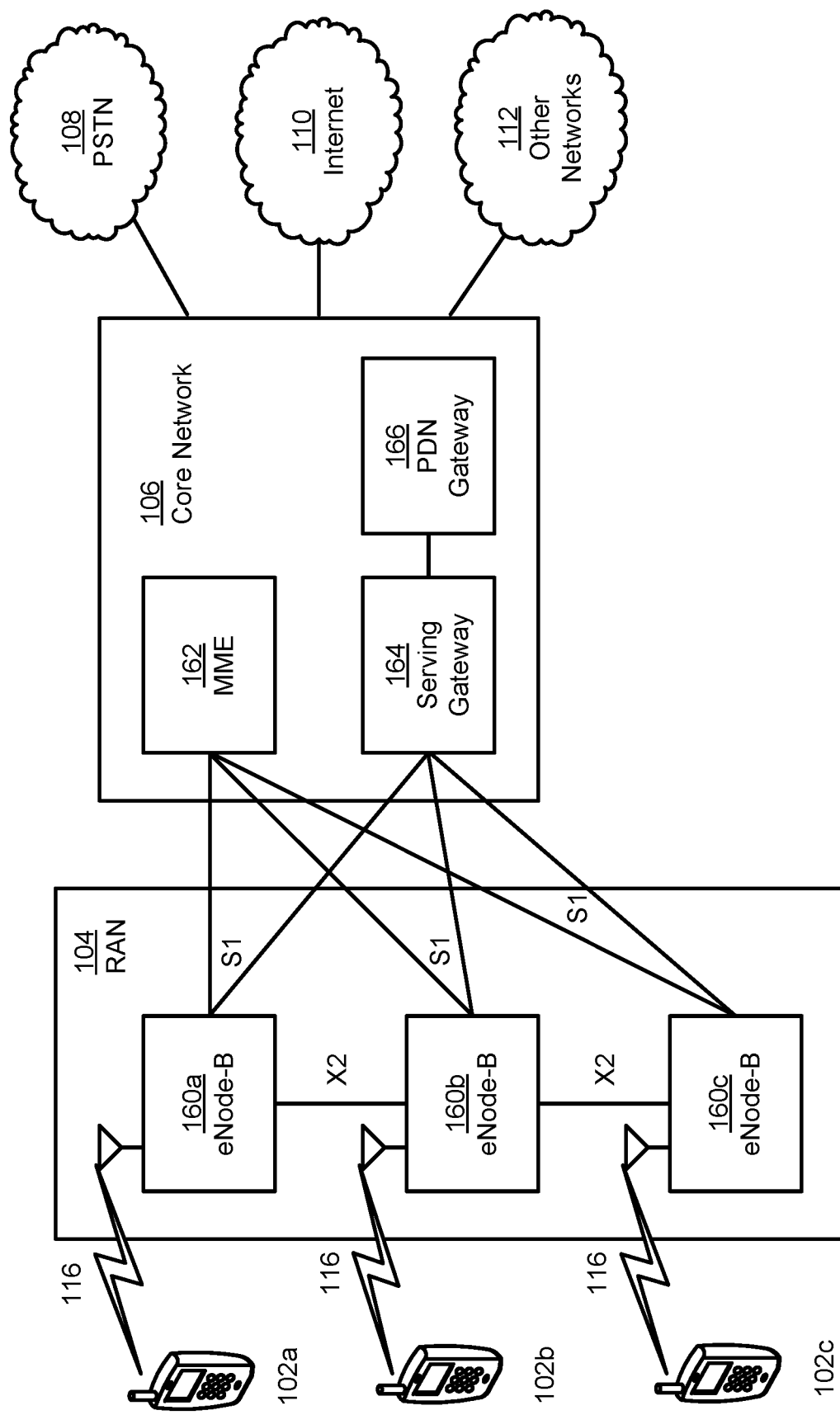
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
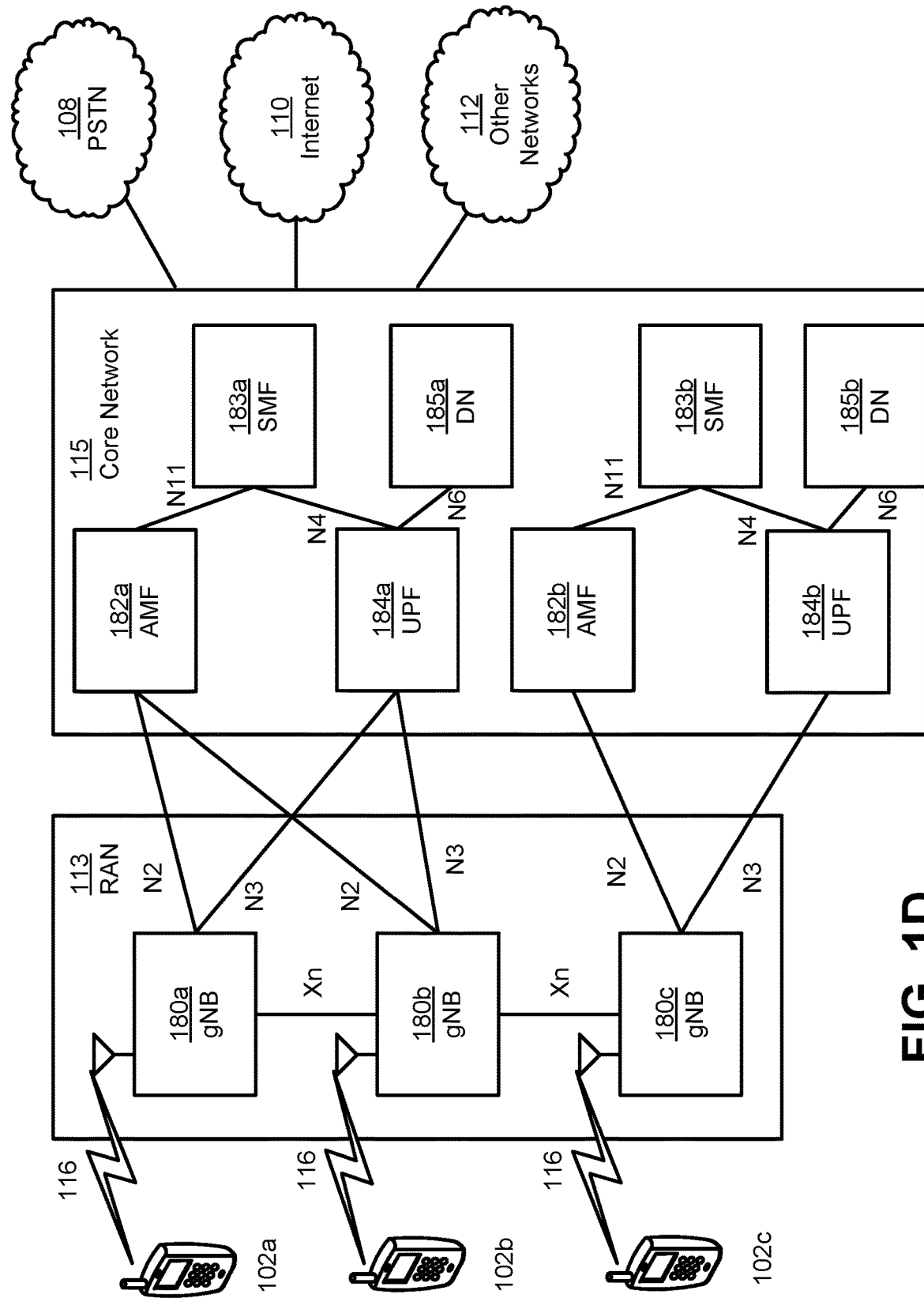
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-ab, UPF 184a-b, SMF 183a-b, DN 185a-b, and/or any other device (s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

As discussed herein, a WTRU can run one or more V2X applications. Source WTRUs are interchangeably referred to as requesting WTRUs, and target WTRUs are interchangeably referred to as destination WTRUs or peer WTRUs herein.

In an example V2X architecture, a V2X Application Server (AS) can be located in the network and can interface with V2X applications installed on the WTRUs (i.e., V2X devices in this context). A V2X Control Function (CF) can handle authorization and provisioning for the V2X devices (i.e., V2X policy and parameters configuration towards the WTRU). The V2X control function (CF) can be located in the 5G CN and may be assumed to be part of the service-based architecture. V2X WTRU-to-WTRU communication can be based on two modes of operation. In a first mode, V2X WTRU-to-WTRU communication can take place over an LTE-Uu interface. In a second mode, V2X WTRU-to-WTRU communication can take place over a PC5 (e.g., V2X sidelink or Proximity-based Services) (ProSe)) interface.

V2X communication over a PC5 reference point is a type of ProSe direct communication. One-to-one ProSe direct communication can be realized by establishing a secure layer-2 (L2) link over PC5 between two WTRUs. The initiating WTRU trying to establish the link must have the L2 identification (ID) for both itself and the peer (target) WTRU. The L2 ID of the target WTRU may be preconfigured on the initiating WTRU or may be obtained via ProSe Direct Discovery. The initiating WTRU may initiate the direct link setup by generating a PC5 Signaling message (e.g., a DIRECT_COMMUNICATION_REQUEST message). The message may include: 1) User Info set 2) an IP Address Config Information Element (IE) 3) a Link Local IPv6 Address IE and 4) a maximum inactivity period IE. If the target WTRU receives the message from the initiating WTRU (e.g., a DIRECT_COMMUNICATION_REQUEST message), the target WTRU may store the pair of the L2 IDs and associate them with the direct link in context. After the completion of link authentication procedure and a successful establishment of the security association, the target WTRU may send a message (e.g., a DIRECT_COMMUNICATION_ACCEPT message) to the initiating WTRU. After receiving the PC5 Signaling message from the target WTRU (e.g., the DIRECT_COMMUNICATION_ACCEPT message), the initiating WTRU may use the established link for all one-to-one communications with the target WTRU.

Each WTRU may have a L2 ID for unicast communication that is included in the Source L2 ID field of every frame that it sends on the L2 link and in the Destination L2 ID of every frame that it receives on the L2 link.

The PC5 signaling protocol supports keep-alive functionality that may be used to detect whether the WTRUs are not in ProSe Communication range, e.g., so that they can proceed with implicit L2 link release. The requesting WTRU may initiate a keep-alive procedure, e.g., if (1) a request from upper layers to check the viability of the direct link is received; or (2) a keep-alive timer for the direct link expires.

The source L2 ID may be changed over time and randomized for security purposes; e.g., to avoid tracking and/or identification of the source WTRU (e.g., a vehicle) by any other WTRUs (e.g., other vehicles) beyond a certain short time-period required by the application. This applies to both WTRUs and identifiers associated with the session; i.e., both source & target.

Some implementations provide a Security Association and Session Identifier ($K_{D\text{-}sess}$ ID). During link establishment, a security association may be created between the peer WTRUs to secure the link, (i.e., to facilitate confidentiality & integrity protection). Each peer WTRU keeps locally a security context containing keys to encrypt/decrypt messages and to integrity protect them. This security context is associated with this specific Peer-to-Peer link. A security association identifier for the specific link (which may be referred to as a $K_{D\text{-}sess}$ ID) may be used by each peer WTRU to identify and retrieve the security context and/or keys if a message is received (e.g., to check the integrity of the message and/or to decrypt it) or if a message needs to be sent (e.g., to encrypt the message and/or to protect its integrity). The session identifier (i.e., $K_{D\text{-}sess}$ ID) is created by concatenating identifier components from each peer, i.e., the most-significant byte (MSB) (i.e., most significant 8 bits) of $K_{D\text{-}sess}$ ID is from the initiating WTRU and the least-significant byte (LSB) (i.e., least significant 8 bits) of K D-sess ID is from the peer WTRU. Each WTRU uses its portion of the $K_{D\text{-}sess}$ ID (i.e., MSB or LSB) to retrieve the security context associated to the link.

Figure 2:
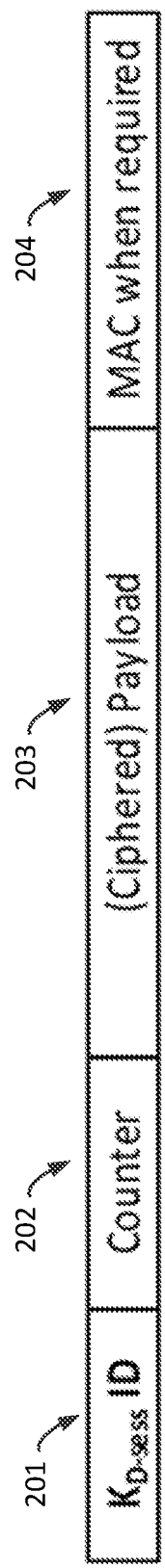
FIG. 2 illustrates an example security context ID format in a PDCP header for one-to-one communications.

FIG. 2 depicts an example 200 of the Packet Data Convergence Protocol (PDCP) header for one-to-one communications. As shown in FIG. 2, the session identifier 201 (i.e., $K_{D\text{-}sess}$ ID) is transmitted with each packet as part of the PDCP header together with a counter 202 representing the number of exchanged packets since establishment of the security context. Also included in the PDCP is a Payload portion 203, which is optionally ciphered, and a Message Authentication Code (MAC) portion 204 when required.

Enhanced V2X (eV2X) may support unicast/multicast over PC5 for eV2X communication. Besides the broadcast mechanism, eV2X may support a new interactive delivery mechanism to handle high data rate data sharing between vehicles; e.g., using unicast and/or multicast. Such mechanisms may utilize a long duration session using the same source L2 ID. This may create a privacy issue if the source L2 ID is tracked and linked. Such privacy issues would affect both peers; i.e., both the source WTRU and target WTRU.

Accordingly, it may be desired to change the source L2 ID while the session is ongoing (e.g., periodically or randomly). However, if the source L2 ID is changed on the source WTRU, the peer WTRU may need to be informed since the ongoing session is identified by source L2 ID. Current ProSe mechanisms do not support source L2 ID modification for an ongoing session. In addition, changing the L2 ID may introduce other problems. For example, a WTRU having multiple sessions and using the same L2 ID must update all its sessions/peers at the same time (or within a defined, e.g., short, time). It may also be necessary for the WTRU to update L2 IDs for each session. For each session, the WTRU may need to keep receiving traffic on its old L2 ID until the change of L2 ID is confirmed by its peer WTRU. Such requirements may generate or require inefficient procedures, and may potentially generate a plurality of message exchanges, e.g., because all WTRUs in this example must periodically change their L2 IDs.

It may also be necessary to address privacy of the security context ID. In some implementations, the security context ID ($K_{D\text{-}sess}$ ID), transmitted in the PDCP header, may be used by an eavesdropper to indirectly detect that the old L2 ID (e.g., source or destination L2 ID) is changed to a new L2 ID, if the same $K_{D\text{-}sess}$ ID is used before and during and/or after L2 ID change procedure.

It may be desired, for privacy or other communication security purposes, for the source WTRU to prevent its old and new L2 ID being linked together by an eavesdropper while communicating the change of its L2 ID to its peer WTRU.

New procedures are typically described herein with reference to the source WTRU and source ID, however it is noted that the source and target WTRUs involved in a communication may each assume the role of the source and/or target, depending on which peer is initiating a specific exchange. Various methods, systems, and devices are discussed herein which facilitate modification of the source and target L2 IDs associated with an ongoing session. The session may be a unicast or multicast session that is used for a certain period of time that is long enough to permit a potential tracking threat. This period may be determined arbitrarily, empirically, or in any suitable manner. The period may depend on the application using it; e.g., an application that transmits information for more than a threshold amount of time. It is noted that V2X, as used in this document, serves as an example of direct WTRU to WTRU (e.g., utilizing a ProSe PC5 interface) communications. It may also apply to other types of WTRU to WTRU communications, (e.g., drones, etc.).

For example, a WTRU may be provisioned with a new interval (e.g., privacy timer), which may be set to the lifetime of its L2 ID for unicast communications and may include privacy protection parameters. Such parameters may also be the output of a function (e.g., a pseudo-random function). According to this interval, the WTRU's L2 ID must be changed (and randomized) within the specified interval, if the session is still ongoing. After the ID has been changed, the timer may be restarted so that the L2 ID will be changed again within the specified period. This process may be repeated as long as the session is ongoing.

As discussed earlier, the change in L2 ID of either or both WTRUs (i.e., either or both, source and target) may need to be communicated to the other WTRU(s) participating in communication. The WTRUs may also need to be made aware of the value of the new L2 ID value. Additionally, the source WTRU may update its security context and security context ID ($K_{D\text{-}sess}$ ID) with its peer WTRU during the procedure used to update its L2 ID. Conversely, the source WTRU may update its L2 ID during the procedure used to update its security context (e.g., Direct Link Rekeying procedure). Since the session involves two WTRUs (i.e., source and target) and two L2 IDs, both L2 IDs may need to be changed simultaneously, and each WTRU may need to be informed when the other WTRU is changing its L2 ID. The new source and target L2 IDs associated with the ongoing session may be changed independently, i.e., one after the other, or at the same time, during the same procedure.

In some examples, more than one event may trigger a L2 ID regeneration and update with the peer WTRU. For example, a timer expiration, the reception of a new L2 ID value from the peer WTRU, the update of an associated application identifier, a request from the peer WTRU, a communication context change, or other events may trigger L2 ID regeneration and update. A high-level view and example methods described below are detailed based on a privacy timer, for the sake of example, however it is understood that any of the triggers discussed above, or any other suitable trigger, may apply.

In some examples, a "relay" WTRU may be used between the source WTRU and target WTRU. This "relay" is not shown or discussed in the various figures and description herein. However, the same procedures as described in the following sub-sections may be applied to communications involving a relay WTRU, the relay being used only to transfer (e.g., "transparently") messages between the source and target WTRUs.

As discussed above, in some implementations, a WTRU having multiple sessions, which use the same L2 ID, must update all of its sessions/peers at the same time (or within a defined, e.g., short, time). In some implementations, for each session, the WTRU needs to keep receiving traffic on its old L2 ID until the change of L2 ID is confirmed by its peer WTRU. This may make the L2 ID change mechanism inefficient and may potentially generate a plurality of message exchanges, e.g., because all WTRUs must periodically change their L2 IDs. Therefore, to simplify the L2 ID update procedure and eliminate or reduce the impacts on other sessions, it is herein disclosed that, in some implementations, a WTRU implementing privacy support may use a different L2 ID per session. Explained another way, in such a newly disclosed implementation, every unicast session with different peer WTRUs would use a different source L2 ID. Also, each session with the same peer WTRU may be associated with only one application. Also, multiple applications running on source/target WTRU may all use distinct sessions.

Figure 3:
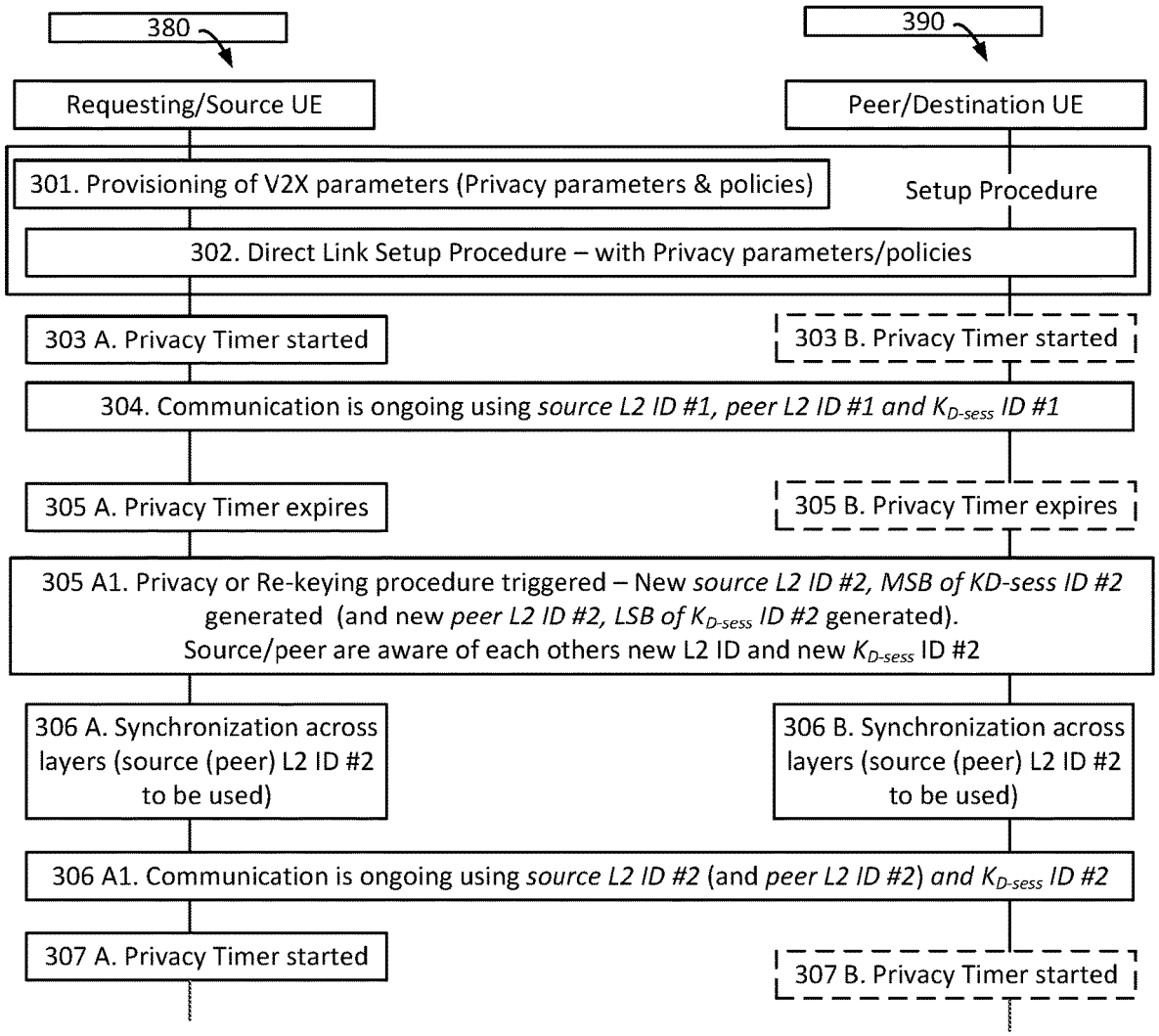
FIG. 3 is a sequence chart illustrating a high-level view of an example change of the source WTRU L2 ID.

FIG. 3 is a sequence chart 300 illustrating a high-level view of an example change of the requesting/source WTRU 380 L2 ID and, optionally, a change of the peer/destination/target WTRU 390 L2 ID, which may occur at the same time.

In reference block 301 of FIG. 3, WTRUs are provisioned with privacy specific parameters, e.g., a privacy timer value, a seed value to generate the L2 ID, a seed value to generate the privacy timer, and so forth. Privacy policies are also provisioned, indicating which methods may be used and for a single WTRU or both WTRUs, e.g., privacy enabled/disabled, L2 ID privacy only, L2 ID+$K_{D\text{-}sess}$ ID privacy, etc. Such provisioning information may be provided by the V2X Control Function (CF), V2X application server (AS) or the parameters may be pre-provisioned in the WTRU (e.g., either in mobile equipment (ME) or in a universal integrated circuit card (UICC)). These parameters may be provisioned on a per-WTRU basis (e.g., to be used for all ProSe/V2X direct communication for a particular WTRU) or on a per-V2X application ID (e.g., intelligent transport systems application identifier (ITS-AID) or provider service identifier (PSID)) basis (e.g., to be used for all ProSe/V2X direct communication for a particular V2X application). In reference block 302 of FIG. 3, PC5 communication is set up between a source WTRU and a peer WTRU (referred to as UEs in FIG. 3). The peer WTRU may be provisioned with privacy-specific parameters (as described above) of the source WTRU, e.g., during session establishment (and vice-versa). Privacy policies received on the peer WTRU may be compared with the peer WTRU's provisioned policies and the privacy protection method matching the highest order may be selected. The source WTRU may be provisioned with privacy-specific parameters (as described above) of the peer WTRU, e.g., during link establishment. Blocks 301 and 302 of FIG. 3 represent a setup procedure for PC5 communications.

In blocks 303 A and 303 B of FIG. 3, a privacy timer is started on the source WTRU (and optionally on the peer WTRU). In block 304 of FIG. 3, communication is ongoing between the source WTRU and peer WTRU using source L2 ID #1 (and peer L2 ID #1) and $K_{D\text{-}sess}$ ID #1. In blocks 305 A and 305 B of FIG. 3, privacy timer expiration may occur, In block 305 A1, source WTRU 380 may apply the selected privacy policy for the ongoing session (assuming here that the selected policy to be applied is L2 ID+$K_{D\text{-}sess}$ ID privacy on both sides): the source WTRU generates a new source L2 ID (e.g., source L2 ID #2) or obtains it by other means; e.g., from the upper layer, and a new portion of the session ID (e.g., MSB of $K_{D\text{-}sess}$ ID #2). The new L2 ID and new MSB of $K_{D\text{-}sess}$ ID #2 are associated with the current source L2 ID and current MSB of $K_{D\text{-}sess}$ ID used for this session and saved locally with the existing ID. The existing source L2 ID (source L2 ID #1) and possibly session ID ($K_{D\text{-}sess}$ ID #1) are still used at this point to identify the ongoing session. The source WTRU sends the new source L2 ID, in a new L2 ID IE, and possibly the new MSB of $K_{D\text{-}sess}$ ID in a new MSB of session ID IE, to the peer WTRU (e.g., using one of the methods described herein) or the peer WTRU itself regenerates a source L2 ID identical to the one obtained on the source WTRU (e.g., using a method described herein). It is noted that in the latter case, the $K_{D\text{-}sess}$ ID may not need to be updated since no privacy message is exchanged between the peer WTRUs. In some implementations, the same steps may be performed on both WTRUs at the same time in order to change the L2 ID, and potentially the session ID, during the same procedure. The privacy timer is just one example trigger for changing the L2 ID and session ID. The L2 ID and session ID may also be generated and subsequently communicated to the other WTRU, for example, if the WTRU receives a new source L2 ID from the peer WTRU e.g., as described herein; if upper layers or an application layer triggers the privacy procedure; if the WTRU moves into a new geographic area; if the WTRU receives new privacy parameters and/or policies from the V2X control function (CF) or V2X application server (AS); or when the UE receives a request from its peer to trigger the privacy procedure, e.g., as described herein.

In some implementations, in case where the V2X layer is triggered to change its L2 ID, e.g., timer, request from peer, etc., the V2X layer may inform/communicate to the upper layer about the imminent change of identity, e.g., for synchronization purposes. The upper layer may reply with a new upper layer identity, which may be sent with the new L2 ID to the peer WTRU. In some implementations, the interface between the V2X layer and upper layer is enhanced to allow such information to be passed; e.g., by an indication from V2X layer to application and a response from application to V2X layer.

In blocks 306 A and 306 B, a new source (and optionally peer) L2 ID and session ID are synchronized/communicated across layers on both WTRUs for PC5 communication. Such synchronization/communication is essentially a communication between layers (e.g., components and/or instances and/or functions) of V2X application portions, no matter where located, to ensure that all such components (hardware and/or software) that rely on updated L2 ID information are updated with the most recent values. The upper layer may be aware of which L2 ID is used and with an AS layer which uses L2 ID for PC5 communication. After the new source L2 ID is synchronized/communicated, new source L2 ID (#2), and possibly session ID (e.g., $K_{D\text{-}sess}$ ID #2), are used for the ongoing session. If a new peer L2 ID #2 is synchronized, it is also used for the ongoing session as in block 306 A1. In blocks 307 A and 307 B, the privacy timer is restarted on the source WTRU (and optionally on the peer WTRU).

Some approaches to updating the L2 IDs and session ID associated with an ongoing session (e.g., block 305 A1 shown and described with respect to FIG. 3) include the following and are detailed further herein.

In a new first method, (Method 1), some examples include an exchange of new L2 IDs between source and target WTRUs. Such examples may include modification of an existing message (e.g., ProSe keepalive messages) to carry the new source L2 ID; e.g., to support concurrent exchange of new source and peer L2 IDs. In a further extension of Method 1, termed Method 3 below, an exchange of new MSB of $K_{D\text{-}sess}$ ID and LSB of $K_{D\text{-}sess}$ ID as well as an exchange of new L2 IDs for the source and peer WTRUs may be supported. Such Method 1-based examples and extensions may also or instead include introduction of new privacy messages and procedures to carry the new source L2 ID, e.g., to support concurrent exchange of new source and peer L2 IDs., and/or to support exchange of new MSB of $K_{D\text{-}sess}$ ID and LSB of $K_{D\text{-}sess}$ ID for a new session ID. In some examples, a WTRU may request its peer to change its L2 ID, which may be referred to as peer triggering. Some examples modify the existing Re-keying messages to support concurrent exchange of new source and peer L2 IDs.

In a new second method, (Method 2) some examples include generation of a peers new L2 ID. In such examples, a source seed may be provided to a target WTRU and a target seed may be provided to the source WTRU. Such examples may include modification of an existing message (e.g., a ProSe keepalive message or PC5 direct link establishment message) to configure the seed to be used for the regeneration of the L2 ID on the peer WTRU. Such examples may also or instead include introduction of a new privacy message to exchange the seed or seeds. Such examples may also or instead update any other PC5 signaling messages to carry the "seed".

In a new third method, (Method 3), briefly described above, the Method 1, also introduced above, may be augmented with the exchange of new session IDs for greater privacy protection. In a new fourth method, (Method 4), an existing re-keying procedure that also produces a new session ID may be enhanced with the exchange of new L2 IDs between communicating WTRUs.

Some examples described herein include privacy parameter and/or policy provisioning on the source WTRU and peer WTRU; e.g., using WTRU (or UE) Configuration Update (UCU) procedure and/or during PC5 link setup.

Some examples include privacy parameters provisioning. For example, provisioning and PC5 link setup procedures may be modified to support a privacy procedure. In some examples, the WTRU (source or target or both) is provisioned with a new privacy timer value and other parameters as described using the same mechanism used for eV2X provisioning, e.g., via a UCU procedure using a non-access stratum (NAS) transparent container, or a V3 interface, or a V2X App Server. A 0-value configuration may disable the source L2 ID regeneration procedure. If no provisioning is provided, a default value may be used.

The WTRU may also be provisioned with a new privacy policy to be used by the WTRU to determine its behavior related to privacy protection. The privacy policy may be specified per V2X Application (e.g., Intelligent Transportation System-AID (ITS-AID) or (Provider Service Identifier (PSID)). The privacy policy may specify e.g., the Privacy Protection Methods (PPM) that are supported and may be identified by preference. For example, the following values may exist: PPM 1: disabled—no privacy handling; PPM 2: L2 ID privacy only using Method 1, single UE L2 ID update; PPM 3: L2 ID privacy only using Method 1, both UEs' L2 ID update; PPM 4: L2 ID privacy only using Method 2, both UEs' L2 ID update; PPM 5: L2 ID+session ID privacy using Method 3; PPM 6: L2 ID+session ID privacy using Method 4; and/or other suitable values.

Figure 4:
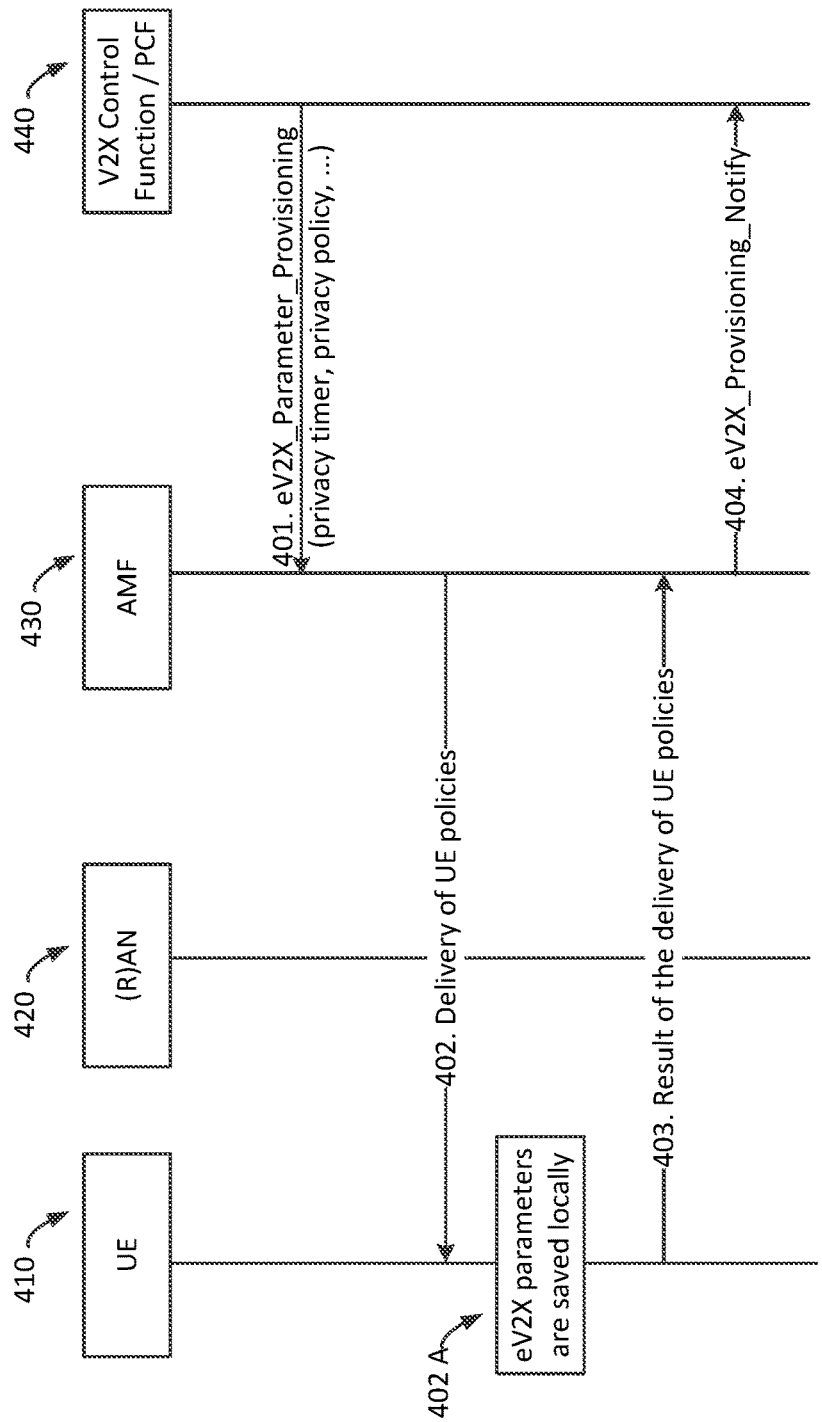
FIG. 4 is a sequence chart illustrating an example of privacy parameter provisioning.

FIG. 4 is a sequence chart 400 illustrating an example of privacy parameter provisioning. In message 401, the V2X Control Function (V2X) or Policy Control Function (PCF) 440 forwards the eV2X provisioning parameters to the AMF 430 in a policy container to configure the WTRU (noted in FIG. 4 as UE 410). New eV2X specific parameters for the privacy support (e.g., privacy timer, seed value to generate the L2 ID, seed value to generate the privacy timer, and so forth) are added to the policy container with the existing parameters. A privacy policy may also be specified. In message 402, AMF transfers the WTRU policy container to the WTRU using (R)AN 420. This transfer may be considered "transparent" because the AMF transfers the WTRU policy container to the WTRU without reading or altering it. The eV2X parameters are saved locally on the UE at block 402 A. In message 403, the WTRU sends the result of the WTRU policies delivery to the AMF. In message 404, AMF notifies the V2X CF or PCF if it has registered to be notified of the reception of the WTRU policy container.

Some examples of privacy procedures include a direct link setup procedure updated with privacy parameters. In some examples, a direct link setup procedure is used to indicate to the other WTRU that the current session requires a change of L2 ID during an ongoing PC5 session. This may be achieved, for example, either by including a new indication in the direct communication request message and/or by passing the privacy timer value from the one WTRU to the other WTRU. A new privacy timer IE containing the privacy timer value may be introduced for this purpose. A new privacy indication IE may also be introduced and may be set to the provisioned value(s), for example PPM 2, PPM 3, PPM 4 (as described above). The PPM selection may be negotiated between the two WTRUs during the link setup. For example, the highest privacy protection supported by both sides may be selected. For example, a PPM 2, PPM 3 and PPM 4 may be supported by originating WTRU and only PPM 2 and PPM 3 are supported on peer WTRU. Thus, PPM 3 (e.g., an L2 ID privacy only using method 1, both WTRUs L2 ID update) is selected for this specific session. The selected PPM determines how the WTRUs behave during the lifetime of the session; i.e., it determines if privacy protection is applied, which method is used, if both peers update their L2 ID, if the session ID is updated, etc. On a given WTRU, different PPMs may be selected for different sessions based on the provisioned privacy policies and above negotiation process. For example, a WTRU may set up two sessions with another WTRU and may select a different PPM for each session (e.g., where each session is associated with a different V2X application and each application carrying its specific privacy policy). The peer WTRU may reject the link setup if no acceptable (e.g., common) PPM is found based on the provisioned values and the values proposed by the originating WTRU.

Figure 5:
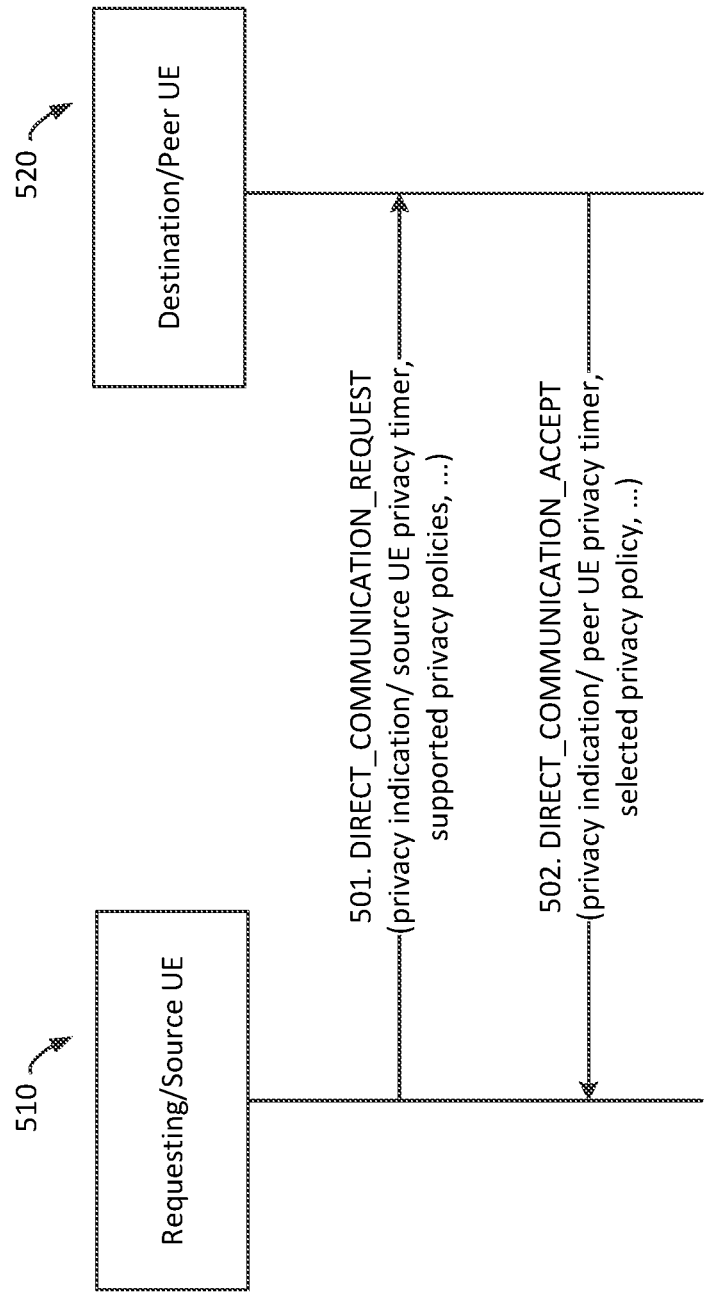
FIG. 5 is a sequence chart illustrating an example of such a direct link setup procedure.

FIG. 5 is a sequence chart 500 illustrating an example of such a direct link setup procedure. Message 501 is a direct communication request, sent from a requesting or source WTRU 510 to a destination or target or peer WTRU 520, that may include a privacy indication, the source WTRU privacy timer, and/or supported privacy policies. Message 502 is a direct communication accept sent in response to the request message from a destination or target or peer WTRU 520 to a requesting or source WTRU 510, that confirms the privacy indication, the source WTRU privacy timer, and/or supported privacy policies sent in the request message. In some examples, the privacy timer value is passed to the other WTRU to inform that WTRU in advance that the L2 ID will change during the lifetime of the session; e.g., periodically. The WTRU receiving a privacy timer configuration from its peer can expect the change within the time specified by the privacy timer value. If the change does not occur within this period, the receiving WTRU may trigger the replacement of this ID; e.g., using the privacy procedure shown and described with respect to FIG. 9.

An example of Method 1 referenced above is now described. Some examples of Method 1 include an exchange of new L2 identifiers. In some examples, WTRUs exchange their new L2 ID during the same procedure, or independently, one after the other. The privacy timer value may also be updated using this procedure.

In some examples, a ProSe direct link keepalive procedure is updated with a new source L2 ID. The ProSe direct link keepalive procedure can be re-used to change the L2 IDs associated with an ongoing session. New L2 ID IEs may be introduced. Existing keepalive messages may include the new L2 ID IEs, which may be set to the new source/target L2 ID values. A new privacy timer value may be provisioned on the WTRU (e.g., as shown and described with respect to FIG. 4) and may be used as a new trigger (a) for the generation of the new L2 ID and (b) to initiate the keepalive procedure, which may include the newly obtained L2 ID IE.

Figure 6:
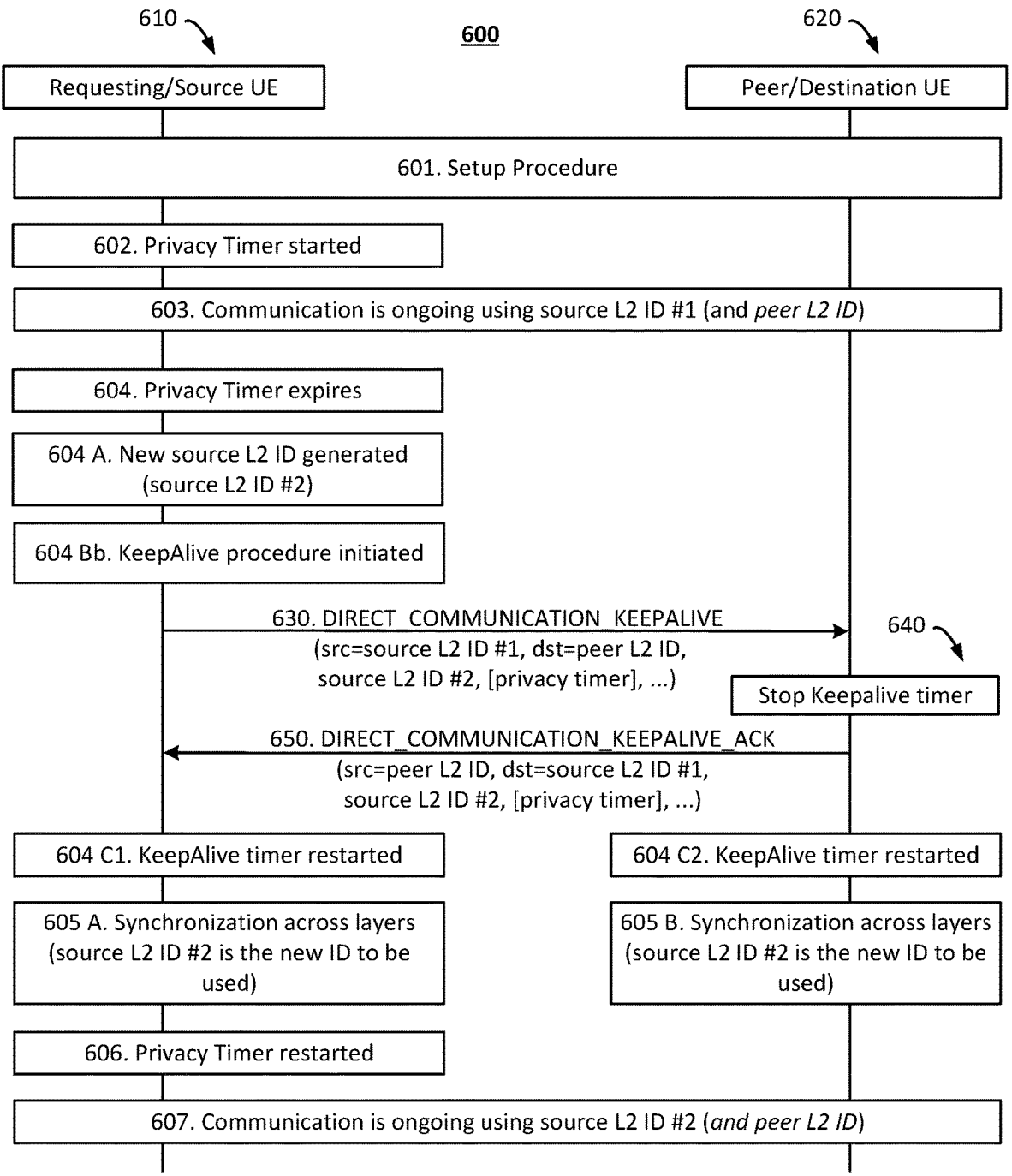
FIG. 6 is a sequence chart illustrating an example exchange of new L2 identifiers using an updated keepalive procedure.

FIG. 6 is a sequence chart 600 illustrating an example exchange of new L2 identifiers on a requesting or source WTRU 610 using an updated direct link keepalive procedure, triggered by the expiration of the privacy timer, to update the Source L2 ID of an existing session on the peer WTRU 620. FIG. 6 represents an example of Method 1 where only the source L2 ID is changed. It is noted that the Keepalive procedure and messages are used for convenience to describe and illustrate the exchange of new source L2 ID. However, other PC5 signaling messages and procedures may be modified in a similar way and used to achieve the same result. In block 601, V2X parameters are provisioned on the WTRUs 610 and 620 and a session is set up. In block 602, the source WTRU 610 runs a privacy timer using the provisioned value. In block 603, communication is ongoing using Source L2 ID #1 (and peer L2 ID). In block 604, the privacy timer expires on the source WTRU 610, and the source L2 ID needs to be updated. In block 604 A, a new source L2 ID is generated (e.g., source L2 ID #2). In block 604 B, source WTRU initiates the keepalive procedure to send the new ID to the peer WTRU. The source WTRU sends a keepalive message 630 to the peer WTRU containing the new Source L2 ID in a new IE (e.g., Source_L2_ID_IE). The current source L2 ID is still used since this is the ID associated at this point with the session and this is the ID that the peer knows/expects to be used. A new privacy timer value may also be configured on the peer WTRU. The peer WTRU receives the new source L2 ID associated with the session and saves it locally. Both L2 IDs (former and new) may be saved locally in case messages using the former ID are in transit during the ID modification procedure. The peer WTRU stops the keepalive timer at block 640 and sends back a keepalive ACK message 650 including the new source L2 ID IE (e.g., Source_L2_ID_IE) set to the same value as received with the keepalive message. The former L2 ID is still used as the destination ID for this message. The old source L2 ID may be deleted from local memory after a message using the new L2 ID is received or, e.g., after a grace period. In step 4*c*, the keepalive timer is restarted on both sides. In blocks 605 A and 605 B, a new source L2 ID is synchronized/communicated across layers on both WTRUs for PC5 communication (e.g., with the upper layer aware of which WTRU ID is used and with AS layer which uses L2 ID for PC5 communication). In block 606, the source WTRU restarts the privacy timer since source L2 ID needs to be changed periodically. In block 607, the new source L2 ID is used from this point on, from both sides.

Figure 7:
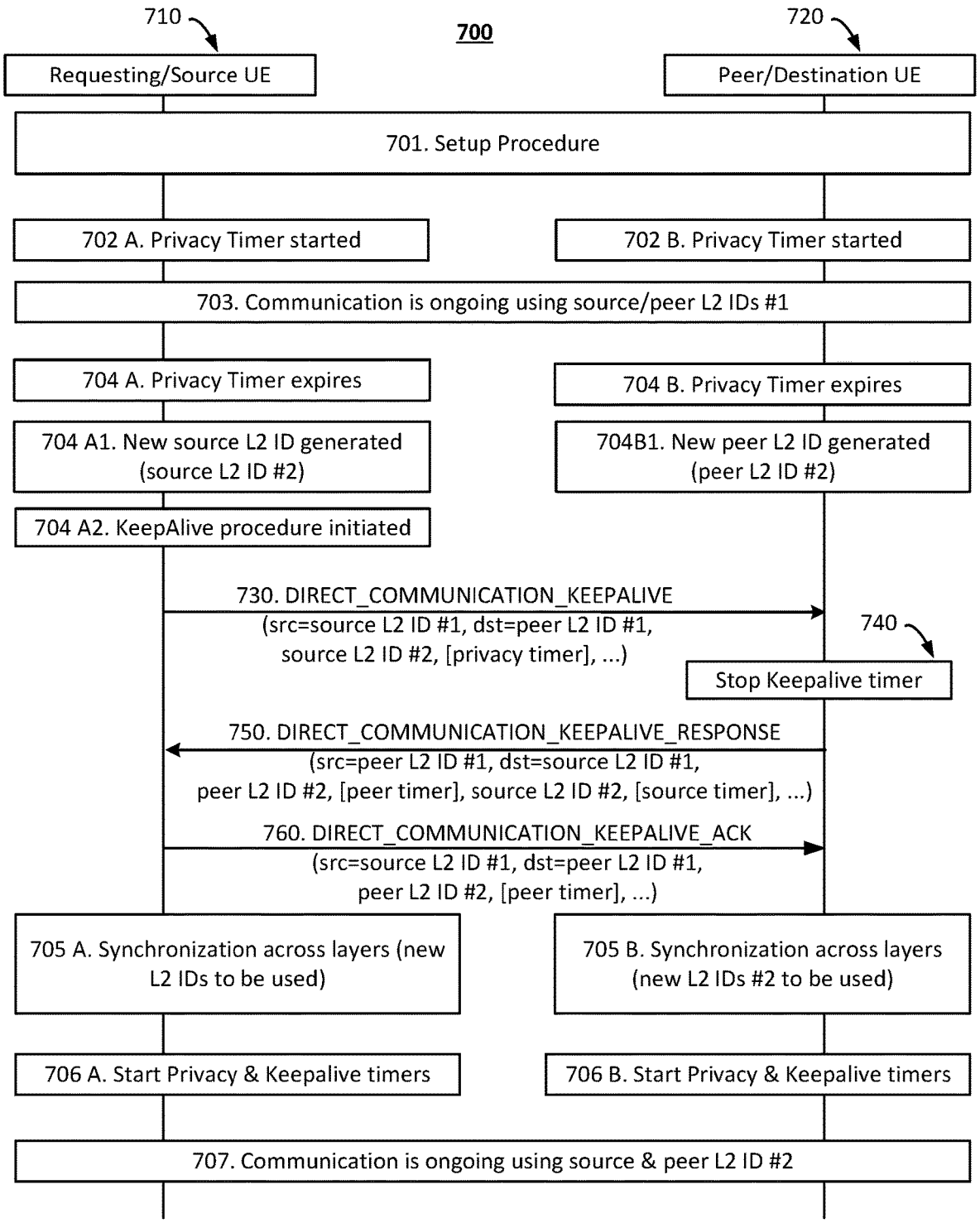
FIG. 7 is a sequence chart illustrating an example of source and peer WTRUs updating their L2 IDs during the same procedure.

In some examples, both WTRUs update their L2 IDs during the same procedure. In such examples, the target WTRU may decide to update its L2 ID at the same time as the source WTRU; e.g., when receiving a keepalive message. FIG. 7 is a sequence chart 700 illustrating an example of this Method 1 exchange where both L2I D are changed in both requesting/source WTRU 710 and the peer/destination WTRU 720. The exchanges in FIG. 7 are similar to the ones previously described with respect to FIG. 6, with some changes as shown in FIG. 7.

For example, block 701 and 703 are the same as in FIG. 6. Block 702 A and 702 B indicates a privacy timer is stated in both WTRUs. In blocks 704 A and 704 B, the privacy timer expires on the source and peer WTRUs and the L2 IDs need to be updated. In blocks 704 A1 and 704 B1, new L2 IDs are generated on both WTRUs (e.g., source L2 ID #2, peer L2 ID #2). In block 704 A2, the source WTRU initiates the keepalive procedure to send its new ID to the Peer WTRU. The source WTRU sends a keepalive message 730 containing its new L2 ID in a new IE (e.g., Source_L2_ID_IE). The current source L2 ID is still used since this is the ID associated at this point with the session and this is the ID that the peer knows/expects to be used. A new privacy timer value may also be configured on the source/peer WTRU. The peer WTRU receives the new source L2 ID and saves it locally. Both L2 IDs (former and new) may be saved locally in case messages using the former ID are in transit during the ID modification procedure. The peer WTRU stops the keepalive timer at block 740 since a keepalive message has been received. The peer WTRU sends back a response message 750 including the new source L2 ID IE set to the same value as received with the keepalive message (i.e., source L2 ID #1). It also includes its new ID in another new IE (e.g., target_L2_ID_JE). The former L2 IDs are still used as the source/destination IDs for this message. After receiving the response message, the source WTRU replies with an acknowledgement message 760 which includes the new target L2 ID IE. However, the former L2 ID of the target is still used as the destination ID for this message. In block 705 A and 705 B, new source/peer L2 IDs are synchronized/communicated across layers on both WTRUs for PC5 communication (e.g., with upper layer aware of which WTRU ID is used and with an AS layer which uses L2 ID for PC5 communication). In blocks 706 A and 706 B, both WTRUs restart the privacy timer since source L2 ID needs to be changed periodically. The keepalive timer is also restarted. In block 707, the new L2 IDs are used from this point on, from both sides. In some examples, a new ProSe direct link privacy procedure is introduced. In such examples, a new dedicated Direct Link Privacy procedure is used to modify the source L2 ID associated with the session. The new privacy procedure uses its own privacy timer and privacy messages (e.g., Privacy_Request, Privacy_Response, Privacy_Trigger). The privacy procedure may be initiated from the source WTRU or the peer WTRU. The procedure may be used to update a L2 ID of a single WTRU or L2 IDs of both WTRUs.

Figure 8:
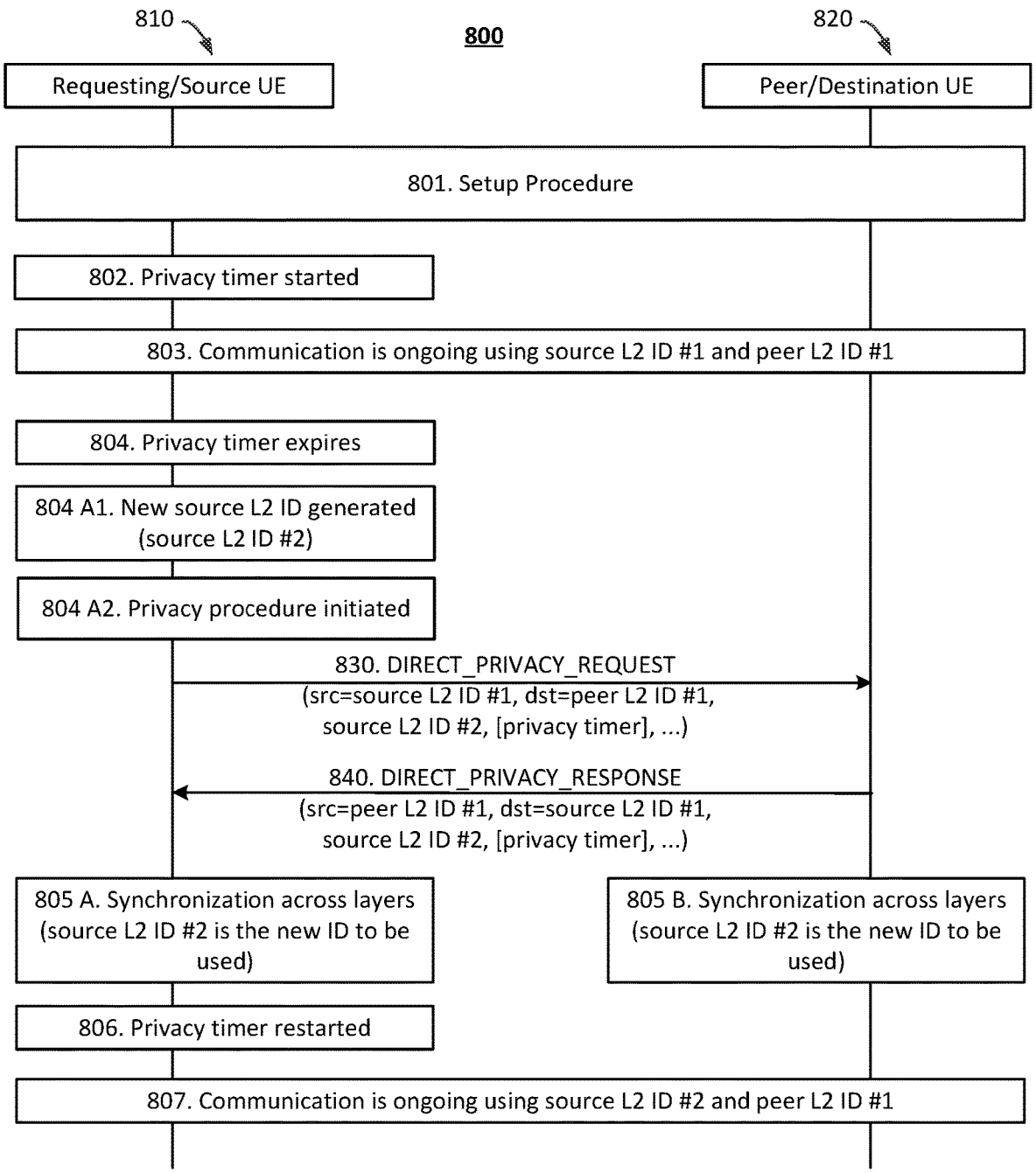
FIG. 8 is a sequence chart illustrating an example of a privacy procedure for a single L2 ID change.

In some examples, the source WTRU initiates the privacy procedure for a single L2 ID change. FIG. 8 is a sequence chart 800 illustrating an example of such a privacy procedure. In this example, the source WTRU has been provisioned with the privacy timer value. At timer expiration, the WTRU obtains a new L2 ID and updates its peer WTRU with the new L2 ID. FIG. 8 represents one example of a newly defined privacy procedure using a direct link privacy communication between two WTRUs corresponding to one option of Method 1.

In block 801, V2X parameters are provisioned on the WTRUs and a session is set up. In block 802, the source WTRU starts a privacy timer using the provisioned value. At block 803, communication is ongoing between the source and peer WTRUs. In block 804, the privacy timer expires on the source WTRU. In block 804 A1, the source WTRU generates a new source L2 ID (e.g., source L2 ID #2). At block 804 A2, the privacy procedure is initiated. The source WTRU sends a Privacy_Request message 830 including the new source L2 ID IE. A new privacy timer value IE may also be specified, if the timer value needs to be changed. The peer WTRU receives the new source L2 ID of its peer and saves it locally. The peer WTRU sends back a Privacy_Response message 840 including the new source L2 ID IE set to the same value as received with the Privacy_Request message 830. At blocks 805 A and 805 B, a new source L2 ID is synchronized/communicated across layers on both WTRUs for PC5 communication (e.g., with upper layer aware of which WTRU ID is used and with AS layer which uses L2 ID for PC5 communication). At block 806, the source WTRU restarts the Privacy timer. at block 807, the new source L2 ID may be used from this point on.

Figure 9:
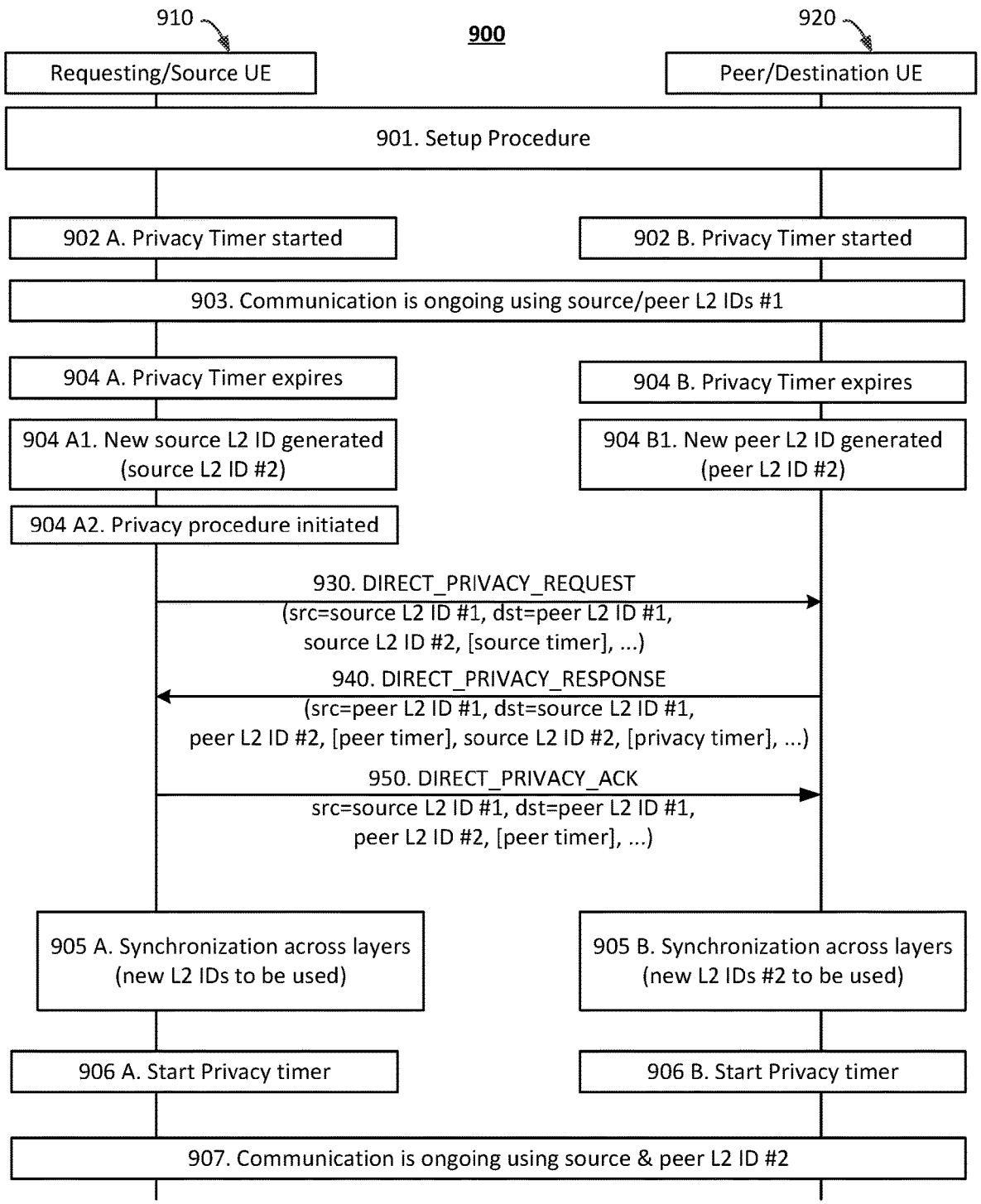
FIG. 9 is a sequence chart illustrating an example source WTRU and peer WTRU L2 IDs are updated during the same procedure.

In some examples, both L2 IDs are updated during the same procedure. FIG. 9 is a sequence chart 900 illustrating an example of such a procedure. In this example, the peer WTRU updates its L2 ID at the same time as the source WTRU, and exchange of new L2 IDs is done during the same procedure. FIG. 9 represents one example of a newly defined privacy procedure using a direct link privacy communication between two WTRUs corresponding to another option of Method 1 where both WTRUs update their L2 IDs in the same procedure.

In block 901, V2X parameters are provisioned on the WTRUs and a session is set up. In blocks 902 A and 902 B, the source WTRU 910 and peer WTRU 920 start a privacy timer using the provisioned value. In block 903, communication is ongoing between the source WTRU and peer WTRU. In blocks 904 A and 904 B, the privacy timer expires on the source WTRU, and possibly on the peer WTRU. In block 904 A1, the source WTRU generates a new Source L2 ID (e.g., source L2 ID #2). The source WTRU sends a Privacy_Request message 930 including the new source L2 ID IE and optionally a new privacy timer IE if the timer value needs to be updated. The peer WTRU receives the new source L2 ID of the source WTRU and saves it locally. At block 904 B1, the peer WTRU generates a new peer L2 ID (e.g., peer L2 ID #2) (a) when privacy timer expires (block 904 B) or optionally (b) at reception of Privacy Request message 930. The peer WTRU sends back a Privacy_Response message 940 including the new source L2 ID IE set to the same value as received with the Privacy Request message and including its new peer L2 ID as well. Optionally a new privacy timer IE may be included if the peer timer value needs to be updated. The source WTRU receives a Privacy Response message 940 which includes a new peer WTRU L2 ID IE, saves this new ID locally, and replies with a Privacy ACK message 950 which includes the new peer L2 ID. At blocks 905 A and 905 B, new L2 IDs are synchronized/communicated across layers on both WTRUs for PC5 communication (e.g., with the upper layer aware of which WTRU ID is used and with AS layer which uses L2 ID for PC5 communication). In blocks 906 A and 906 B, each WTRU restarts its privacy timer. In block 907, the new L2 IDs are used from this point on.

In some examples, a WTRU triggers a privacy procedure at the peer side. For example, a WTRU may request its peer to change its L2 ID (e.g., the peer WTRU requests the source WTRU to change its L2 ID—i.e., the source L2 ID). The source WTRU receiving such a request may trigger the L2 ID update procedure. In this case, the source WTRU obtains a new L2 ID and updates its peer WTRU with the new L2 ID. The peer WTRU, which has been configured with the source WTRU privacy timer value during link setup procedure, may decide to trigger the source WTRU L2 ID change; e.g., if (a) it receives a trigger locally (e.g., from upper layer) or it determines that the source L2 ID should be changed (e.g., for any suitable reason or additional trigger) or (b) the peer WTRU wants to update its own L2 ID at the same time as the source WTRU.

Figure 10:
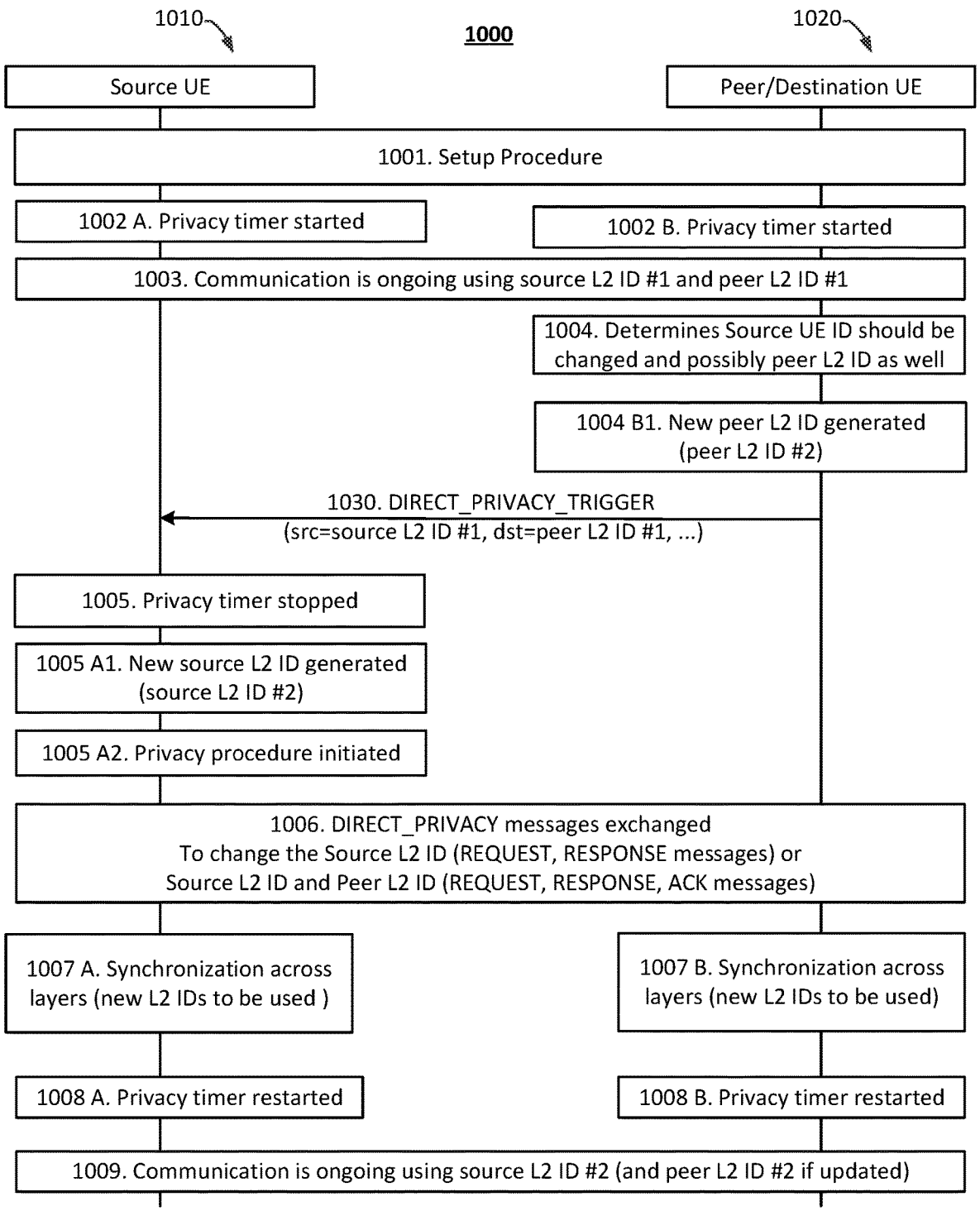
FIG. 10 is a sequence chart illustrating an example where the peer WTRU triggers the L2 ID change procedure.

FIG. 10 is a sequence chart 1000 illustrating an example Method 1 procedure where the peer WTRU triggers the L2 ID change procedure. In block 1001, a session is set up and communication is ongoing between the source WTRU 1010 and peer WTRU 1020. In blocks 1002 A and 1002 B, both WTRUs may begin a privacy timer. At block 1003, communication is ongoing between the source WTRU and peer WTRU. In block 1004, the peer WTRU determines that the source WTRU should change its L2 ID and the peer L2 ID may possibly need to be changed as well. The peer WTRU sends a new Privacy_Trigger message 1030 to the source WTRU. The peer WTRU may generate a new L2 ID if its L2 ID needs to be updated at optional block 1004 B1. Otherwise, the source WTRU receiving this trigger message 1030 stops its privacy timer at block 1005. In block 1005 A1, new source L2 ID is generated (e.g., source L2 ID #2). In block 1005 A2, the source WTRU initiates the privacy procedure to send its new ID to the peer WTRU. The direct privacy messages are exchanged in block 1006. Alternatively, the source WTRU may use the keepalive procedure, e.g., as shown and discussed with respect to FIG. 6, to send the new source L2 ID to the peer WTRU. Procedures as shown and described with respect to FIGS. 6 and 8 may be used if only the source L2 ID is changed. Procedures as shown and described with respect to FIGS. 7 and 9 may be used if both L2 IDs are changed. In blocks 1007 A and 1007 B, new L2 IDs are synchronized/communicated across layers on both WTRUs for PC5 communication (e.g., with the upper layer aware of which WTRU ID is used and with an AS layer which uses L2 IDs for PC5 communication). In blocks 1008 A and 1008 B, the privacy timer is restarted on the both WTRUs. In block 1009, communication is ongoing using the new source L2 ID #2 and the new peer L2 ID #2 if it has changed.

An example Method 2 L2 ID change includes generation of peer L2 IDs on source and target WTRUs. In some Method 2 examples, the peer L2 ID is regenerated from the source WTRU itself instead of exchanging the new ID via messages. In such examples, each WTRU may be provisioned with a list of possibly secret parameters, and seeds, during the provisioning of V2X parameters stage along with the other necessary V2X parameters. The seeds may be used for the regeneration of the L2 ID of the WTRU.

After the session is established between a source WTRU and peer WTRU, and after the security keys are exchanged and the communications are secured, the source WTRU and peer WTRU may exchange their privacy timer value and a seed. Accordingly, a WTRU is configured with its peer's (a) privacy timer value and (b) a seed to be used for the new L2 ID regeneration.

The same seed or another seed (e.g., provisioned for generating the timer) value may be used by the WTRU to generate the privacy timer. If a different seed is used to generate the timer value, such seed value may also be exchanged between the WTRUs. The seed value for the timer may facilitate randomization of the timer value for changing the privacy timer.

In some examples, a list of seeds, potentially with corresponding timers, may be configured on both sides and exchanged during the same procedure. This described procedure may reduce or limit the message exchange over the air. The seed used to generate a new L2 ID of the target WTRU may be chosen in a consecutive manner from the list of seeds provided after the privacy timer expires. The WTRU starts a peer_privacy_timer, and when the timer expires, it regenerates its peer L2 ID based on the configured seed. At the same time, the peer WTRU also regenerates its own L2 ID using the same seed, and the same value is obtained. The generation of the new L2 ID of the target WTRU may be periodic. The seed and timer value may be configured on the peer WTRU using an updated keepalive mechanism, any other updated PC5 signaling messages, or new messages.

Figure 11:
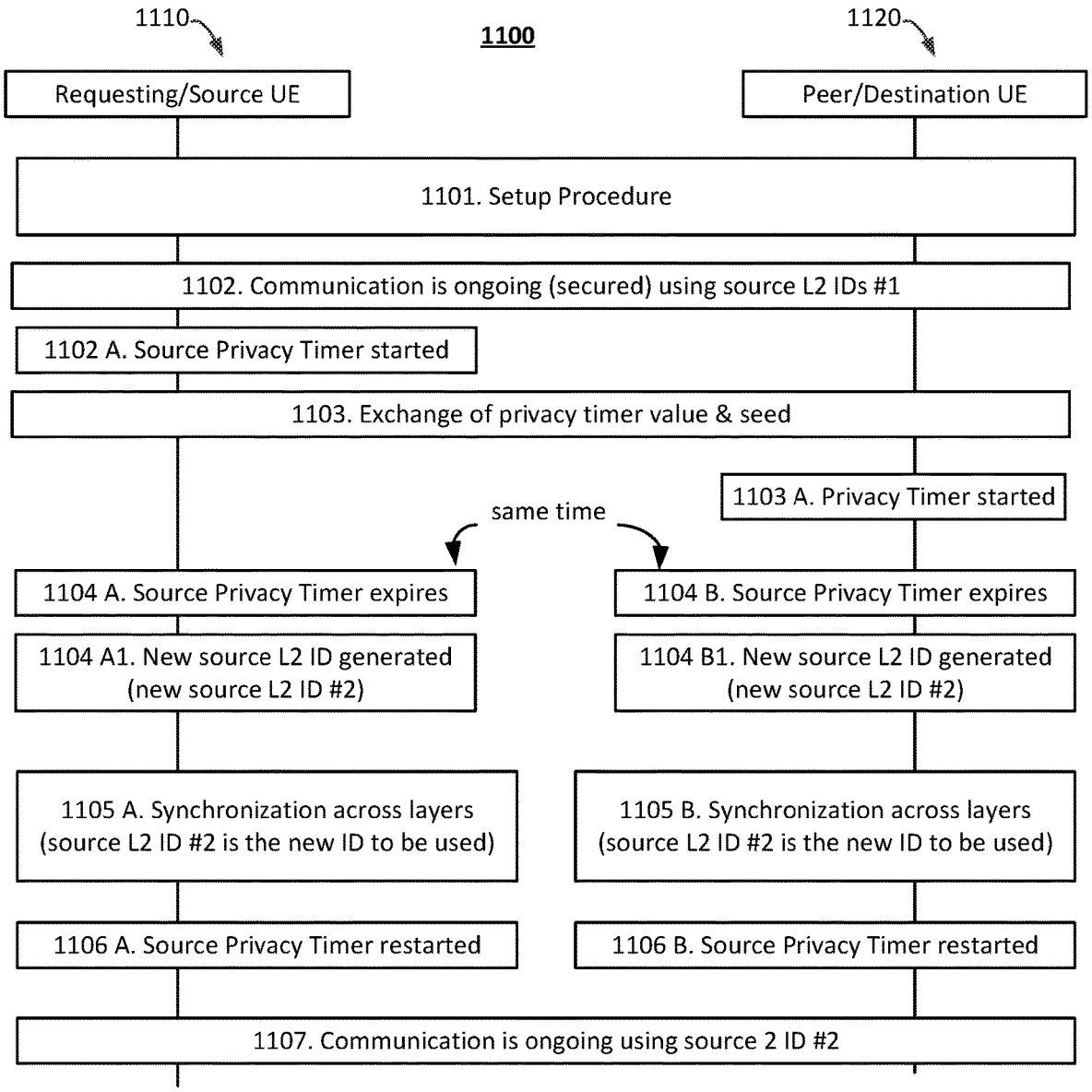
FIG. 11 is a sequence chart illustrating an example procedure where the source WTRU configures the peer WTRU and source WTRU L2 ID updates.

FIG. 11 is a sequence chart 1100 illustrating an example Method 2 procedure where the source WTRU configures the peer WTRU to be able to regenerate the source L2 ID after a timer expires. Such mechanisms may be used from the destination WTRU to the source WTRU. In FIG. 11, the source L2 ID is regenerated on the source WTRU and the peer WTRU. In block 1101, a session is set up between the source WTRU and the peer WTRU. In block 1102, communication between the source WTRU and the peer WTRU is ongoing. "Source L2 ID #1" is used at this point. In block 1102 A, a privacy timer is started on the source WTRU. In block 1103, the privacy timer and a seed are sent to the peer WTRU (e.g., using either an updated keepalive mechanism or new messages). The timer may indicate, for example, a 15-minute duration and a specific start time. In this example, the timer will expire every 15 minutes past the specified start time. This may facilitate expiration of the timers on both sides at the same time, even though they are not started at the same time. In block 1103 A, the peer WTRU saves the source WTRU privacy timer value and seed and starts a source WTRU privacy timer. The procedures used to exchange info, e.g., as shown and described with respect to FIGS. 6 and 8, may be used here, however, the privacy timer+seed are transported in this case (new IE for seed). In blocks 1104 A and 1104 B, after timer expiry, the source WTRU uses the seed that has been shared with its peer to generate a new L2 ID. In blocks 1104 A 1 and 1104 B1, on the target WTRU, the timer has expired at the same time as on the source WTRU. The target WTRU uses the seed value received from the source WTRU to regenerate a new source WTRU L2 ID. The same value for the source L2 ID is obtained on both WTRUs. In blocks 1105 A and 1105 B, the new source L2 ID is synchronized/communicated across layers on both WTRUs for PC5 communication (e.g., with the upper layer aware of which WTRU ID is used and with an AS layer which uses L2 ID for PC5 communication). In blocks 1106 A and 1106 B, the privacy timer is restarted on both WTRUs. In block 1107, communication is ongoing between the source WTRU and the peer WTRU based on the newly formed source L2 ID #2.

In some examples, an updated keepalive mechanism (e.g., as shown and described with respect to FIG. 6) or new messages (e.g., as shown and described with respect to FIG. 8) may be used to exchange the privacy timer value and seed. The timer value and seed may be updated regularly and/or periodically.

Figure 12:
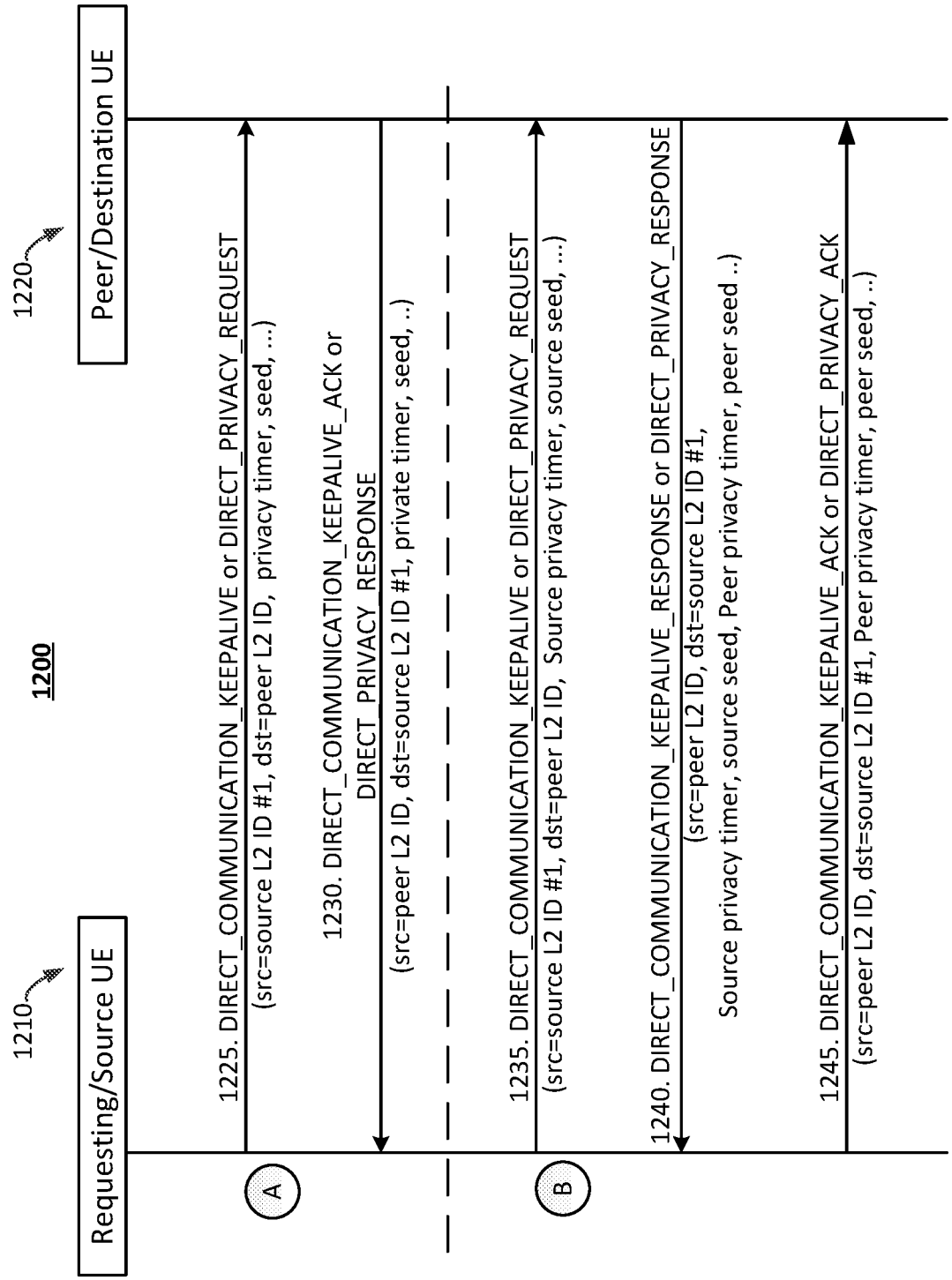
FIG. 12 is a sequence chart illustrating privacy timer value and seed configuration.

FIG. 12 is a sequence chart 1200 illustrating (A) a WTRU 1210 configuring its privacy timer value & seed on the peer WTRU 1220 and (B) both WTRUs exchanging their configuration. FIG. 12 illustrates a Method 2 exchange of privacy timer value and seeds. Sequence A is an example message exchange where the requesting/source WTRU sends its privacy timer and seed values to the per WTRU. At sequence A, in message 1225, a WTRU 1210 sends a direct communication keepalive, direct privacy request, or other message that contains relevant information for the transfer of WTRU 1210 privacy timer and seed values to the peer WTRU 1220. After receipt, the peer WTRU 1220 transmits a response message 1230 which may be an acknowledgement of the received request message 1225. The acknowledgement message 1230 may include the source WTRU privacy timer value and source seed value among other possible message content. Sequence B may be an alternative to sequence A. Sequence B is an example message exchange where both WTRUs exchange their respective privacy timer and seed values. At sequence B, in message 1235, a WTRU 1210 sends a direct communication keepalive, direct privacy request, or other message that contains relevant information for the transfer of WTRU 1210 privacy timer and seed values to the peer WTRU 1220. After receipt, peer WTRU 1220 transmits a response message 1240 which may be a response of the received request message 1235. The response message 1240 may include the source WTRU privacy timer value and source seed value and the peer privacy timer and peer seed value among other possible message content. After receipt of the response message 1240, the source WTRU 1210 may transmit message 1245 which may be a direct communication keepalive acknowledgement, direct privacy acknowledgement, or other message that contains relevant information for the transfer of peer WTRU 1220 privacy timer and seed values back to the peer WTRU 1220. The above exchange examples A and B may establish a configuration for the WTRUs as in block 1103 of FIG. 11 of Method 2.

An example Method 3 may augment the exchange of new L2 identifiers with an exchange of a new session ID. In one example, Method 3 augments Method 1 with the exchange of a new session ID. For example, as described above, WTRUs may exchange their new session ID during the L2 ID change procedure, independently (i.e., one after the other) or simultaneously during the same procedure. Further, a WTRU may be configured to update its security context identifier (e.g., session identifier) at the same time as its L2 ID, e.g., for privacy reasons. To facilitate this, the exchange of new L2 identifiers discussed above is augmented with additional privacy protection by enabling the exchange of the MSB/LSB of $K_{D\text{-}sess}$ ID in addition to the source and destination L2 IDs.

In a first scenario, the initiating/requesting/source WTRU may have a privacy timer running. If the privacy timer expires, or if a trigger is received from the peer WTRU, the initiating/requesting/source WTRU fetches the security context associated with the session and executes the L2 ID update procedure (e.g., as discussed above regarding ProSe direct link keepalive procedure updated with new source L2 ID, or where the source WTRU initiates a privacy procedure with a single L2 ID change. In addition to the L2 ID regeneration, the WTRU may generate a new session identifier (i.e., MSB of $K_{D\text{-}sess}$ ID). This new session ID may be sent to the peer WTRU along with the new L2 ID. It is noted that the communication is already secured, i.e., the exchanged L2 ID and session ID are encrypted, and integrity protected. The new identifiers are used when the procedure is successfully completed. It is noted that the security context content per se is not modified, i.e., the keys and other parameters (e.g., counter) saved in the security context are still the same, only the session identifier, used to locate the security context locally on the initiating/requesting/source WTRU and peer/destination WTRU (i.e., on each peer WTRU), is updated.

Figure 13:
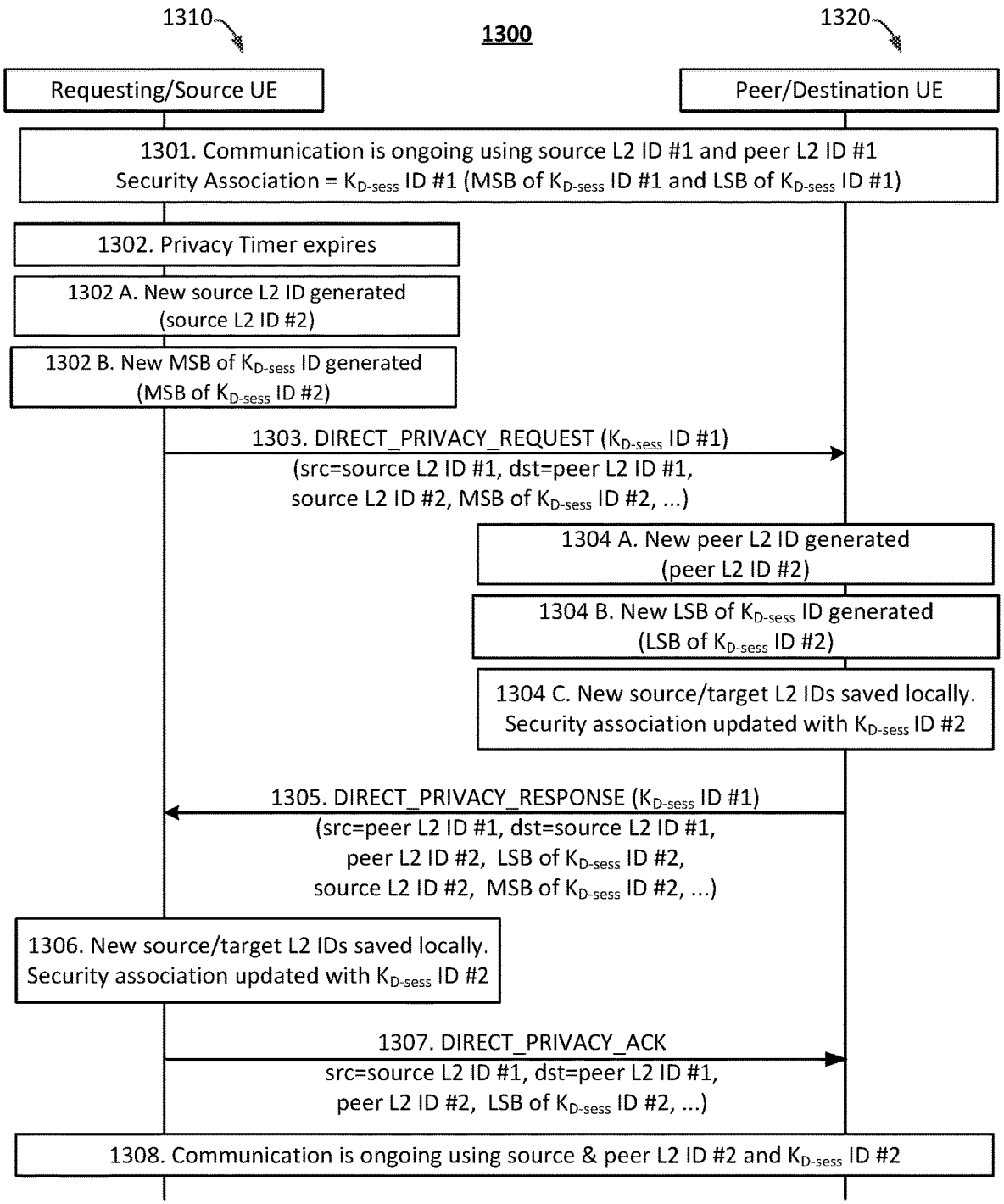
FIG. 13 is a message sequence chart illustrating a case where both WTRUs exchange their new portion of the session ID using the privacy procedure.

In a second scenario, both WTRUs update their IDs during the same procedure, that is, both L2 IDs are updated during the same procedure and both WTRUs change their portion of the session identifier at the same time; during the same privacy procedure. In this case, both WTRUs generate a new portion of the session ID (MSB and LSB) and exchange them along with their new L2 ID. This is illustrated in FIG. 13, using Direct Privacy messages. FIG. 13 is a message sequence chart 1300 illustrating a case where both WTRUs exchange their new portion of the session ID using the privacy procedure.

In the example of FIG. 13, communication is ongoing between source WTRU 1310 and peer WTRU 1320 in block 1301, where the source WTRU is using L2 ID #1 and the peer WTRU is using its own L2 ID #1. A security association, identified by the session ID ($K_{D\text{-}sess}$ ID #1) has been established between the WTRUs; i.e., each WTRU has saved locally a security context containing the required security parameters (e.g., encryption keys) to secure the communication. All information exchanged between the peers is encrypted and integrity protected. The initiating WTRU uses the MSB of $K_{D\text{-}sess}$ ID to locate the security context and the peer WTRU uses the LSB of $K_{D\text{-}sess}$ ID on its side.

In block 1302, a privacy timer expires on source WTRU. The source WTRU generates a new Source L2 ID (e.g., source L2 ID #2) in block 1302 A, and the source WTRU generates a new MSB of $K_{D\text{-}sess}$ ID (e.g., MSB of $K_{D\text{-}sess}$ ID #2) in block 1302 B. The source WTRU sends a Privacy_Request message 1303 or another PC5 Signaling message (e.g., a PC5 Link Update message including the new Source L2 ID IE and new MSB of $K_{D\text{-}sess}$ ID IE) and optionally a new privacy timer IE.

The peer WTRU receives the new source L2 ID and new MSB of $K_{D\text{-}sess}$ ID of message 1303 and saves them locally, to eventually replace the previous values currently in use. In block 1304 A, the peer WTRU generates a new peer L2 ID (e.g., peer L2 ID #2). In block 1304 B, the peer WTRU generates a new LSB of $K_{D\text{-}sess}$ ID (i.e., LSB of $K_{D\text{-}sess}$ ID #2). In block 1304 C, the peer WTRU saves its newly generated identifiers locally. The security context is updated locally with the $K_{D\text{-}sess}$ ID #2.

The Peer WTRU sends back (to the source WTRU) a Privacy_Response message 1305 or another PC5 Signaling message (e.g., PC5 Link Update Response message) including the new source L2 ID IE and new source MSB of $K_{D\text{-}sess}$ ID IE set to the same values as received with the Privacy Request message and including its new peer L2 ID IE and new peer LSB of $K_{D\text{-}sess}$ ID IE as well. In another embodiment, the peer WTRU does not send back the new source L2 ID IE and new source MSB of $K_{D\text{-}sess}$ ID IE with the source WTRU expected to retrieve them locally based on current session context. For example, the source WTRU may store these in the security context identified by current source MSB of $K_{D\text{-}sess}$ ID at the time they were generated. In block 1306, the source WTRU, receiving a Privacy Response message 1305, which includes the new peer L2 ID IE and new peer LSB of $K_{D\text{-}sess}$ ID IE, saves these new IDs locally and replies with a Privacy Ack message 1307 which includes the new peer L2 ID and new LSB of $K_{D\text{-}sess}$ ID. In block 1308, the new L2 IDs and of $K_{D\text{-}sess}$ ID (MSB and LSB) are used from this point onward.

An example Method 4 may enhance existing re-keying procedures with the exchange of new L2 IDs. In one example, Method 4 an existing re-keying procedure may be enhanced with the exchange of new L2 IDs between communicating WTRUs. The existing re-keying procedure is used to update the security context of an ongoing session. In this case, all parameters are updated, e.g., keys are regenerated, counters are reset, and a new session ID is generated as well.

As an alternative to various approaches discussed herein, this approach uses an existing re-keying procedure (e.g., as discussed in 3GPP TS 33.303 6.5.5.3) and enhances it with the possibility of exchanging the new source and destination L2 IDs between the peer WTRUs, along with the new session ID. As for other approaches discussed herein, a privacy timer may be used to trigger this enhanced re-keying procedure. Other triggers may also exist, (e.g., from upper layers, a request from peer WTRU, before the counter for current link repeats with current keys, etc.).

It is noted that the re-keying procedure may imply a change of the complete session ID, i.e., MSB and LSB portions, and may be done using the already established session. Thus, all messages exchanged between the peers are encrypted and integrated protected. The change of L2 ID may however be done on a single WTRU only, if needed, or both WTRUs.

Figure 14:
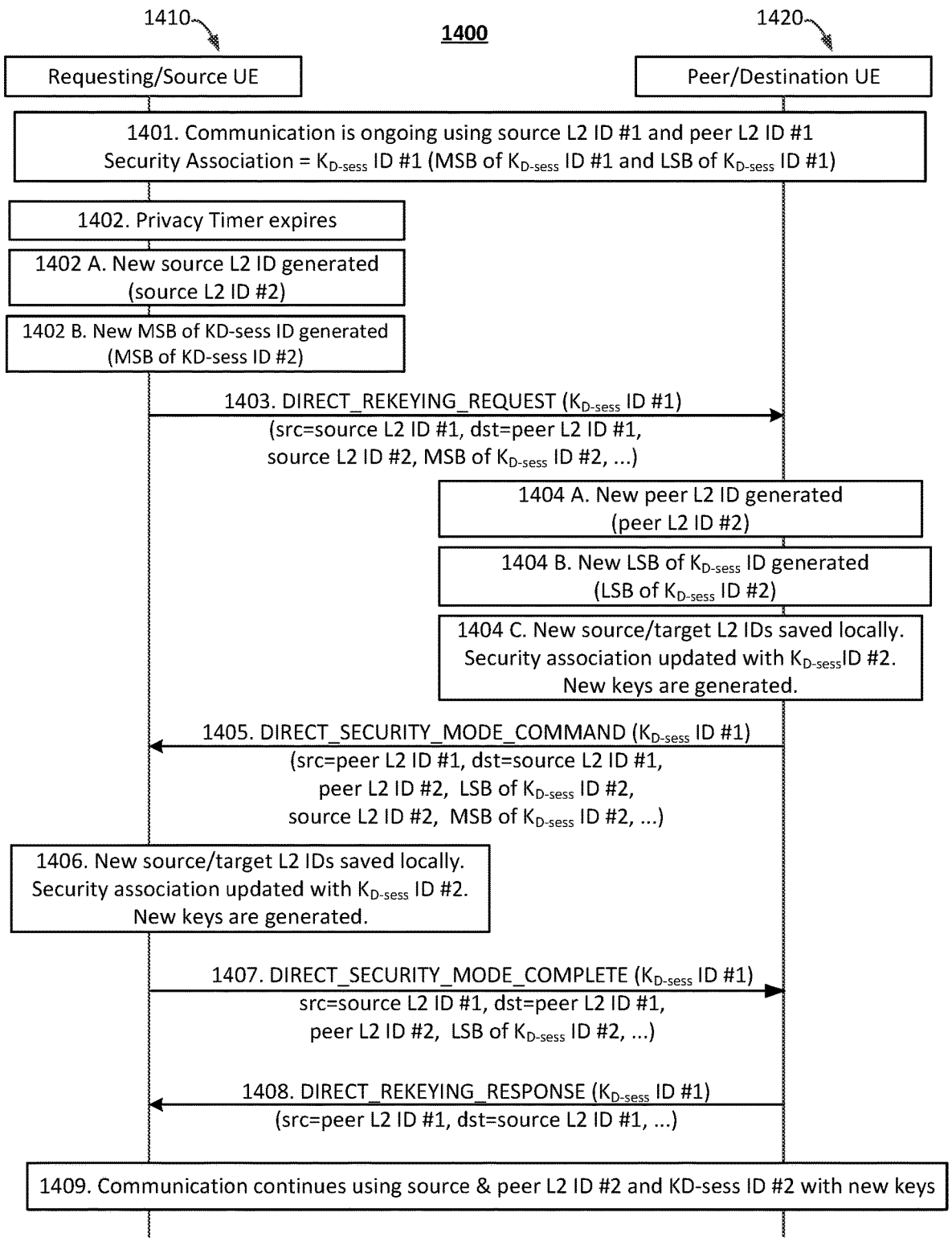
FIG. 14 is a message sequence chart illustrating exchange of new L2 IDs using an enhanced re-keying procedure.

FIG. 14 is a message sequence chart 1400 illustrating exchange of new L2 IDs using an enhanced re-keying procedure. FIG. 14 provides an example use of Method 4 which provides for an exchange of L2 IDs of both the source and peer WTRUs in the context of a re-keying procedure. In block 1401, communication is ongoing between source and peer WTRUs. The source WTRU 1410 is using L2 ID #1 and the peer WTRU 1420 is using its own L2 ID #1. A security association, identified by the session ID ($K_{D\text{-}sess}$ ID #1) has been established between the source and peer WTRUs (e.g., each WTRU has locally saved a security context containing the required security parameters e.g., encryption keys) to secure the communication.

In block 1402, a privacy or re-keying timer expires on source WTRU (or another trigger occurs, e.g., from the upper layer). The source WTRU triggers the re-keying procedure enhanced with the L2 ID update exchange. In block 1402 A, the source WTRU generates a new Source L2 ID (e.g., source L2 ID #2). In block 1402 B, the source WTRU generates a new MSB of $K_{D\text{-}sess}$ ID (i.e., MSB of $K_{D\text{-}sess}$ ID #2). The source WTRU sends a DIRECT_REKEYING_REQUEST message 1403 including the new Source L2 ID IE and new MSB of $K_{D\text{-}sess}$ ID, and optionally a new privacy timer IE. The existing security context and L2 IDs are still used to send this message, i.e., the old source/destination L2 ID and existing $K_{D\text{-}sess}$ ID.

The peer WTRU receives the new source L2 ID and new MSB of $K_{D\text{-}sess}$ ID of the source WTRU via message 1403 and saves them locally, along with the previous values. In block 1404 A, the peer WTRU generates a new peer L2 ID (e.g., peer L2 ID #2). In block 1404 B, the peer WTRU generates a new LSB of $K_{D\text{-}sess}$ ID (i.e., LSB of $K_{D\text{-}sess}$ ID #2). In block 1404 C, the WTRU saves its newly generated identifiers locally. The security context is updated locally with the $K_{D\text{-}sess}$ ID #2 however the old $K_{D\text{-}sess}$ ID #1 is kept and used at this point, as well as the old source/destination L2 IDs.

The peer WTRU sends back (to the source WTRU) a DIRECT_SECURITY_MODE_COMMAND message 1405 including the new source L2 ID IE and new source MSB of $K_{D\text{-}sess}$ ID IE set to the same values as received with the DIRECT_REKEYING_REQUEST message 1403 (to acknowledge them) and including its new peer L2 ID IE and new peer LSB of $K_{D\text{-}sess}$ ID IE as well. In another embodiment, the peer WTRU does not send back the new source L2 ID IE and new source MSB of $K_{D\text{-}sess}$ ID IE with the source WTRU expected to retrieve them locally based on current session context. For example, the source WTRU may store these in the security context identified by current source MSB of $K_{D\text{-}sess}$ ID at the time they were generated.

In block 1406, after the source WTRU, receiving a DIRECT_SECURITY_MODE_COMMAND message 1405, which specifies the peer WTRU's new L2 ID IE and peer WTRUs new LSB of $K_{D\text{-}sess}$ ID IE, saves these new IDs locally. A security association is updated with $K_{D\text{-}sess}$ ID #2. New keys are generated. The source WTRU replies by transmitting a DIRECT_SECURITY_MODE_COMPLETE message 1407 which repeats the peers new L2 ID and new LSB of $K_{D\text{-}sess}$ ID (i.e., acknowledging them). The Peer WTRU, receiving a DIRECT_SECURITY_MODE_COMPLETE message 1407 acknowledging its new L2 ID and LSB of $K_{D\text{-}sess}$ ID, replies by sending back a DIRECT_REKEYING_RESPONSE message 1408 which completes the procedure. In block 1409, from this point on, the new L2 IDs and security context, i.e., $K_{D\text{-}sess}$ ID (MSB and LSB) and keys are used.

It is noted that for convenience, most of the procedures in this document are described from the perspective of interactions between the WTRUs from the V2X layer/NAS layer or upper layers. The same procedures may also be applicable at the level of RRC signaling exchange between the WTRUs or when PC5 messages are exchanged over the RRC protocol.

Figure 15:
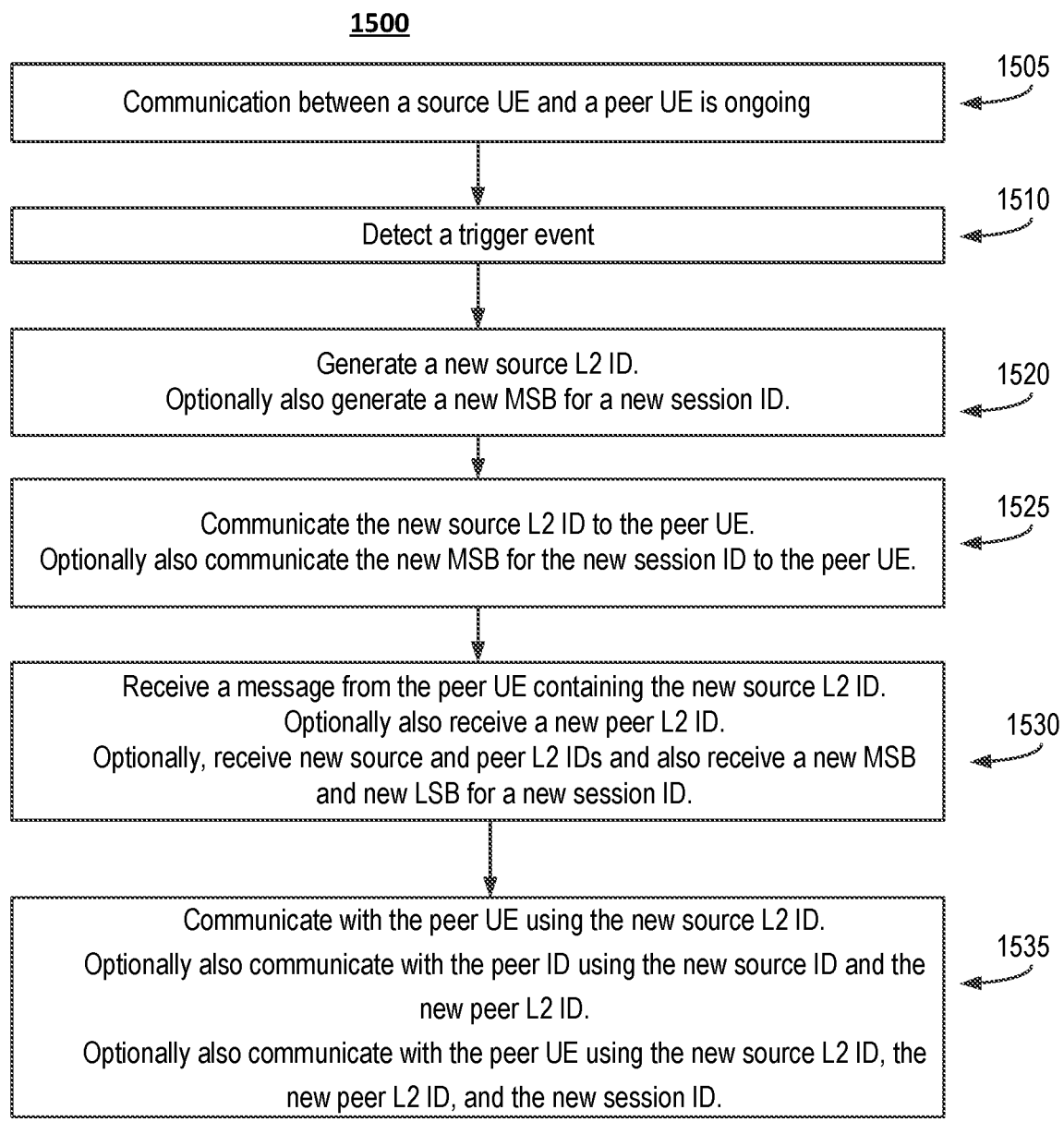
FIG. 15 is a flow diagram of a method employing elements of a procedure of changing at least a source L2 ID.

It is noted that various figures expressed herein are related to one another and as such share common procedural elements. For example, the Method 1 example procedure of FIGS. 6 through 10 share common setup procedures. In a more global example, the procedures of FIGS. 6-10 are all variations of Method 1 which includes exchanges of new L2 IDs between source and peer WTRUs. In addition, FIG. 13 is a Method 1 that is enhanced using the feature of new session ID generation using a new MSB of session ID from a source WTRU and a new LSB of session ID from a peer WTRU. FIG. 15 illustrates a logical combination of such shared procedures from the perspective of a source WTRU. In FIG. 15, the procedures of FIG. 6, FIG. 7, and FIG. 13 are shown highlighting the options that may be exercised using Method 1. Other variations of the expressed examples are possible using techniques expressed herein. Specifically, as shown in FIG. 15, the common operations of Method 1 shown in the detailed examples of FIG. 6, FIG. 7, and FIG. 13 are presented. FIG. 15 addresses the Method 1 options of (i) a communication between the source and peer WTRU is updated with only a new source L2 ID (reference FIG. 6), (ii) a communication between the source and peer WTRU updated with both a new source L2 ID and a new peer L2 ID, or (iii) a communication between the source and peer WTRU updated with the both the new source L2 ID and the peer L2 ID as well as contributions of MSB and LSB of session ID from the source and peer WTRU respectively to communicate using a new session ID.

FIG. 15 is a procedure 1500 with options that may be exercised by a source WTRU conducting the principles of Method 1 described herein. At block 1505, a source WTRU is assumed to have an ongoing communication with a peer WTRU. In one example environment, the communication is a PC5 reference link communication in a V2X operation where each WTRU has access to a V2X application that includes the privacy application provisions described herein. At block 1510, a trigger event is detected. Such a trigger event drives the reaction of the source WTRU to conduct the operations of blocks 1520 through 1535. Such a trigger event may be a detected condition and may include a timer that expires on the WTRU, or an upper layer or an application layer of a V2X application that requests a new L2 ID, or the source WTRU moving into a new geographic area, or the source WTRU receiving new provisioning parameters from the V2X control function or from a V2X application server, or the source WTRU receiving a request from the peer WTRU to change an L2 ID.

At block 1520, on a condition that the trigger event occurred, the source WTRU may generate a new L2 ID for future communications with the peer WTRU. This is similar to the example block 604 A of FIG. 6 which uses Method 1. Optionally, at block 1520, the WTRU may also generate a new MSB for a new session ID. This option is a variation of Method 1 which is similar to example block 1302 B of FIG. 13. Both FIG. 6 and FIG. 13 share common operational elements as variations of Method 1. At block 1525 of FIG. 15, The source WTRU communicates, via message transmission to the peer WTRU, the value of the new source L2 ID for use by the peer WTRU. This Method 1 operation, also shown in FIG. 6 example message 630 as an example direct communication keepalive type message. But, as taught above, such messages may be of any commonly known and used messages between WTRUs or may be a specialized message such as a direct privacy request message between WTRUs. At block 1525 in FIG. 15, the communication between WTRUs may optionally also transfer not only the new L2 ID of the source WTRU, but also the new MSB for a new session ID. This option is a Method 1 variation shown in FIG. 13 example message 1303 as a direct privacy request type message.

At block 1530, the source WTRU receives a message from the peer WTRU. The message responds to the new source ID and may contain a confirmation of the new source L2 ID from the peer WTRU. Such an example of the Method 1 operation is shown in FIG. 6 example message 650 as a keepalive acknowledge message. However, as mentioned above, the message type may be any message type that is used between WTRUs including a new direct privacy communication message. Optionally at block 1530 of FIG. 15, if the Method 1 operation includes the generation of a new peer WTRU L2 ID, as in the Method 1 operation of FIG. 7, then the message at block 1530 may include both a confirmation of the new source L2 ID and the new peer WTRU L2 ID. The message that includes both the new source and the new peer L2 IDs is a variation of Method 1 shown in FIG. 7 example message 750. A third option for block 1530 of FIG. 15 includes the Method 1 variation shown in FIG. 13 which includes information of the new source L2 ID, the new peer L2 ID, the new MSB for a new session ID, and a new LSB from the peer WTRU for use in a new session ID. The source WTRU, in the option of using a new session ID, after having received the New MSB and LSB would generate a new session ID for the communication between the source WTRU and the peer WTRU as is described with regard to FIG. 13.

At block 1535, the source WTRU may communicate with the peer WTRU using or based on the new source L2 ID. This action is included in a Method 1 operation as shown in example block 607 of FIG. 6. As an option, if the Method 1 operation includes a change of both the source and the peer L2 IDs as in the Method 1 operation of FIG. 7, then block 1535 of FIG. 15 allows the source WTRU to communicate with the peer WTRU using the new source L2 ID, and the new peer L2 ID. This operation is also shown in the Method 1 operation of FIG. 7 example block 707. In block 1535 of FIG. 15, a further Method 1 option is for the source WTRU to communicate with the peer WTRU using the new source L2 ID, the new peer L2 ID, and a new session ID that includes the MSB contribution from the source WTRU and the LSB contribution from the peer WTRU. This Method 1 operation is shown in FIG. 13 example block 1308.

Thus, Method 1 is shown as having some common operations that allow different variations according to whether the communication between the source and peer WTRU is updated with only a new source L2 ID, updated with both the new source L2 ID and the peer L2 ID, or updated with the both the new source L2 ID and the peer L2 ID as well as contributions of MSB and LSB from the source and peer WTRU respectively to communicate with a new session ID.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random-access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

It is also to be understood that the terminology used herein is for the purpose of describing particular embodiments only and is not intended to be limiting. As used herein, when referred to herein, the terms "station" and its abbreviation "STA", "user equipment" and its abbreviation "UE" may mean (i) a wireless transmit and/or receive unit (WTRU), such as described infra; (ii) any of a number of embodiments of a WTRU, such as described infra; (iii) a wireless-capable and/or wired-capable (e.g., tetherable) device configured with, inter alia, some or all structures and functionality of a WTRU, such as described infra; (iii) a wireless-capable and/or wired-capable device configured with less than all structures and functionality of a WTRU, such as described infra; or (iv) the like.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of" multiples of the items and/or the categories of items, individually or in conjunction with other items and/or other categories of items. Moreover, as used herein, the term "set" or "group" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, ¶6 or means-plus-function claim format, and any claim without the terms "means for" is not so intended.

A processor in association with software may be used to implement a radio frequency transceiver for use in a wireless transmit receive unit (WTRU), user equipment (UE), terminal, base station, Mobility Management Entity (MME) or Evolved Packet Core (EPC), or any host computer. The WTRU may be used m conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra Wide Band (UWB) module.

Throughout the disclosure, one of skill understands that certain representative embodiments may be used in the alternative or in combination with other representative embodiments.

In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method for use in an ongoing vehicle-to-everything session, the method comprising:
   communicating between a source wireless transmit/receive unit (WTRU) and a peer WTRU using an existing source WTRU layer 2 identifier (L2 ID), an existing peer WTRU L2 ID, and an existing session identifier (ID) for an existing session having an existing security context;
   on a condition that a trigger event occurs:
      generating, by the source WTRU, a new source WTRU L2 ID and a new most significant byte (MSB) of a new session ID;
      transmitting, by the source WTRU to the peer WTRU, the new source WTRU L2 ID and the new MSB of the new session ID;
      receiving, from the peer WTRU, a new peer L2 ID and a new least significant byte (LSB) of the new session ID;
      transmitting, by the source WTRU to the peer WTRU, an acknowledgement of the new peer WTRU L2 ID and the new LSB of the new session ID; and
      communicating with the peer WTRU using the new source WTRU L2 ID, the new peer WTRU L2 ID, and the new session ID that comprises the new MSB and the new LSB, wherein the communication with the peer WTRU occurs in the existing session using the existing security context.

2. The method of claim 1, wherein communicating between the source WTRU and the peer WTRU comprises using the existing source WTRU L2 ID, the existing peer WTRU L2 ID, and the existing session ID until after transmitting the acknowledgement.

3. The method of claim 1, wherein:
   transmitting the new source WTRU L2 ID and the MSB of the new session ID to the peer WTRU comprises transmitting using one of a keepalive procedure, a privacy procedure, a PC5 link update procedure, or another communication procedure used between the source WTRU and the peer WTRU.

4. The method of claim 1, wherein on condition that a trigger event occurs comprises any of:
   on condition that a timer expires;
   on condition that an upper layer or an application layer of a V2X application requests a new L2 ID;
   on condition that the source WTRU moved into a new geographic area;
   on condition that the source WTRU received new provisioning parameters from a V2X control function or a V2X application server; or on condition that the source WTRU received a request from the peer WTRU to change an L2 ID.

5. The method of claim 1, wherein the session ID is a security context session ID.

6. The method of claim 1, wherein communicating with the peer (WTRU) comprises communicating on a PC5 reference link.

7. A source wireless transmit/receive unit WTRU comprising circuitry, including a transmitter, a receiver, a processor, and memory, the source WTRU configured to:
　communicate, using the transmitter and receiver, between the source WTRU and a peer WTRU using an existing source WTRU layer 2 identifier (L2 ID), an existing peer WTRU L2 ID, and an existing session ID for an existing session having an existing security context;
　on a condition that a trigger event occurs:
　　generate by the source WTRU, a new source WTRU L2 ID, and a new most significant byte (MSB) of a new session ID;
　　transmit, by the source WTRU to the peer WTRU, the new source WTRU L2 ID and the new MSB of the new session ID;
　　receive, from the peer WTRU, a new peer WTRU L2 ID and a new least significant byte (LSB) of the new session ID from the peer WTRU;
　　transmit, by the source WTRU to the peer WTRU, an acknowledgement of the new peer WTRU L2 ID and the new LSB of the new session ID; and
　　communicate with the peer WTRU using the new source WTRU L2 ID, the new peer WTRU L2 ID, and the new session ID that comprises the new MSB and the new LSB, wherein the communication with the peer WTRU occurs in the existing session using the existing security context.

8. The source WTRU of claim 7, wherein communicating between the source WTRU and the peer WTRU comprises using the existing source WTRU L2 ID, the existing peer WTRU L2 ID and the existing session ID until after transmitting the acknowledgement.

9. The source WTRU of claim 8, wherein:
　the trigger event comprises at least one of:
　　an expiration of a timer;
　　a request for a new L2 ID from an upper layer or an application layer of a V2X application;
　　a movement of the source WTRU into a new geographic area;
　　a reception by the source WTRU of new provisioning parameters from a vehicle to everything (V2X) control function or a V2X application server; or
　　a reception of a request by the source WTRU from the peer WTRU to change an L2 ID.

10. The source WTRU of claim 7, wherein the source WTRU is configured to:
　communicate the new source WTRU L2 ID and the new MSB of the new session ID to the peer WTRU by communicating using one of a keepalive procedure, a privacy procedure, a PC5 link update procedure, or another communication procedure used between the source WTRU and the peer WTRU.

11. The source WTRU of claim 7, wherein the session ID is a security context session ID.

12. The source WTRU of claim 7, wherein the source WTRU communicates with the peer WTRU on a PC5 reference link.

13. A non-transitory computer-readable storage medium embodying instructions, which when executed by a computer, cause the computer to perform a method for use in an ongoing vehicle-to-everything (V2X) session, the method comprising:
　communicating between a source wireless transmit/receive unit (WTRU) and a peer WTRU using an existing source WTRU layer 2 identifier (L2 ID), an existing peer WTRU L2 ID, and an existing session ID for an existing session having an existing security context;
　on a condition that a trigger event occurs:
　　generating, by the source WTRU, a new source WTRU L2 ID and a new most significant byte (MSB) of a new session ID;
　　transmitting, by the source WTRU to the peer WTRU, the new source WTRU L2 ID and the new MSB of the new session ID;
　　receiving, from the peer WTRU, a new peer L2 ID and a new least significant byte (LSB) of the new session ID;
　　transmitting, by the source WTRU to the peer WTRU, an acknowledgement of the new peer WTRU L2 ID and the new LSB of the new session ID; and
　　communicating with the peer WTRU using the new source WTRU L2 ID, the new peer WTRU L2 ID, and the new session ID that comprises the new MSB and the new LSB, wherein the communication with the peer WTRU occurs in the existing session using the existing security context.

14. The non-transitory computer-readable storage medium of claim 13, wherein communicating between the source WTRU and the peer WTRU comprises using the existing source WTRU L2 ID, the existing peer WTRU L2 ID, and the existing session ID until after transmitting the acknowledgement.

15. The non-transitory computer-readable storage medium of claim 13, wherein:
　transmitting the new source WTRU L2 ID and the MSB of the new session ID to the peer WTRU comprises transmitting using one of a keepalive procedure, a privacy procedure, a PC5 link update procedure, or another communication procedure used between the source WTRU and the peer WTRU.

16. The non-transitory computer-readable storage medium of claim 13, wherein on condition that a trigger event occurs comprises any of:
　on condition that a timer expires;
　on condition that an upper layer or an application layer of a V2X application requests a new L2 ID;
　on condition that the source WTRU moved into a new geographic area;
　on condition that the source WTRU received new provisioning parameters from a V2X control function or a V2X application server; or
　on condition that the source WTRU received a request from the peer WTRU to change an L2 ID.

17. The non-transitory computer-readable storage medium of claim 13, wherein the session ID is a security context session ID.

* * * * *